(12) United States Patent
Nishio

(10) Patent No.: US 8,520,271 B2
(45) Date of Patent: Aug. 27, 2013

(54) IMAGE READING APPARATUS AND IMAGE FORMING APPARATUS PROVIDED WITH SAME

(75) Inventor: Yukihito Nishio, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 473 days.

(21) Appl. No.: 12/792,178

(22) Filed: Jun. 2, 2010

(65) Prior Publication Data

US 2010/0315691 A1    Dec. 16, 2010

(30) Foreign Application Priority Data

Jun. 15, 2009  (JP) ................................. 2009-142449

(51) Int. Cl.
*H04N 1/04*   (2006.01)
(52) U.S. Cl.
USPC ............ 358/475; 358/474; 358/509; 358/497
(58) Field of Classification Search
USPC .................. 358/474, 497, 475, 509, 501, 2.1, 358/3.27, 1.13
See application file for complete search history.

(56) References Cited

U.S. PATENT DOCUMENTS

| | | | | |
|---|---|---|---|---|
| 5,625,470 A * | 4/1997 | Ueta et al. | ...................... | 358/505 |
| 6,469,727 B1 * | 10/2002 | Wada et al. | ..................... | 347/240 |
| 6,750,990 B1 * | 6/2004 | Ohashi | ........................ | 358/496 |
| 6,792,161 B1 * | 9/2004 | Imaizumi et al. | ............. | 382/275 |
| 6,979,834 B2 * | 12/2005 | Ochiai et al. | ............. | 250/559.42 |
| 7,034,450 B2 * | 4/2006 | Konagaya | .................... | 313/498 |
| 7,307,763 B2 * | 12/2007 | Yamamoto | ................... | 358/474 |
| 7,548,355 B2 * | 6/2009 | Nagano | ......................... | 358/487 |
| 7,692,818 B2 * | 4/2010 | Futami | ........................ | 358/3.26 |
| 7,710,618 B2 * | 5/2010 | Ishiguro et al. | ............... | 358/514 |
| 7,719,726 B2 * | 5/2010 | Kamei et al. | .................... | 358/463 |
| 7,733,364 B2 * | 6/2010 | Nomura et al. | ............... | 347/241 |
| 7,777,913 B2 * | 8/2010 | Nagasaka | ...................... | 358/1.3 |
| 7,813,005 B2 * | 10/2010 | Arai | .............................. | 358/2.1 |
| 7,889,393 B2 * | 2/2011 | Yoshizawa | ................... | 358/3.01 |
| 7,889,919 B2 * | 2/2011 | Komiya et al. | ............... | 382/162 |
| 8,018,631 B2 * | 9/2011 | Kagami | ........................ | 358/486 |
| 8,149,473 B2 * | 4/2012 | Oshida et al. | ................. | 358/474 |
| 8,305,655 B2 * | 11/2012 | Harada | ......................... | 358/475 |
| 2002/0071141 A1 * | 6/2002 | Katakura et al. | ............. | 358/474 |
| 2002/0176634 A1 * | 11/2002 | Ohashi | ......................... | 382/275 |
| 2003/0150918 A1 * | 8/2003 | Nogami et al. | ............... | 235/454 |
| 2006/0002591 A1 * | 1/2006 | Hombo | ......................... | 382/115 |
| 2007/0291324 A1 * | 12/2007 | Kamei et al. | .................. | 358/474 |
| 2008/0225355 A1 * | 9/2008 | Kagami | ........................ | 358/496 |

FOREIGN PATENT DOCUMENTS

| | | |
|---|---|---|
| JP | 03-106168 | 5/1991 |
| JP | 10-056542 | 2/1998 |
| JP | 2001-148765 | 5/2001 |
| JP | 2002-258545 | 9/2002 |
| JP | 2006-148677 | 6/2006 |
| JP | 2010-010826 | 1/2010 |

* cited by examiner

*Primary Examiner* — Negussie Worku
(74) *Attorney, Agent, or Firm* — Renner, Otto, Boisselle & Sklar, LLP

(57) ABSTRACT

In one embodiment, in a state in which a first scanning unit is positioned at a reading position below an original reading glass and a second scanning unit is positioned such that an original is not caused to travel between the original reading glass and a reading guide plate of a first reading portion, control is performed to selectively turn on or turn off each LED of an illumination portion of the first scanning unit to produce a shadow of paper dust, and detection is performed on variation in an output of a CCD corresponding to the shadow of the paper dust.

18 Claims, 18 Drawing Sheets

|  |  | 1 | 2 | 3 | 4 | 5 | ... | m-1 | m | ... | n-1 | n |
|---|---|---|---|---|---|---|---|---|---|---|---|---|
| | 1 | ON | OFF | OFF | OFF | OFF | ... | OFF | OFF | ... | OFF | OFF |
| | 2 | ON | ON | OFF | OFF | OFF | ... | OFF | OFF | ... | OFF | OFF |
| sequential | 3 | ON | ON | ON | OFF | OFF | ... | OFF | OFF | ... | OFF | OFF |
| turn-on | : | : | : | : | : | : | | : | : | | : | : |
| control | m-1 | ON | ON | ON | ON | ON | ... | ON | OFF | ... | OFF | OFF |
| | : | : | : | : | : | : | | : | : | | : | : |
| | n | ON | ON | ON | ON | ON | ... | ON | ON | ... | ON | ON |

IMAGE READING APPARATUS AND IMAGE FORMING APPARATUS PROVIDED WITH SAME

CROSS-REFERENCE TO RELATED APPLICATIONS

This application claims priority under 35 U.S.C. §119(a) on Patent Application No. 2009-142449 filed in Japan on Jun. 15, 2009, the entire contents of which are herein incorporated by reference.

BACKGROUND OF THE INVENTION

1. Field of the Invention

The present invention relates to image reading apparatuses, in which an original on a transparent original reading plate is read through this original reading plate, and image forming apparatuses provided with these.

2. Description of the Related Art

This type of image reading apparatus reads images of originals and is also referred to as a scanner, and is used independently or equipped in a copier or the like. When used independently, an image of the original that has been read is outputted to an external printer or the like, and when used equipped in a copier, the image of the original that has been read is reproduced by the copier.

This image reading apparatus is provided with a transparent original reading plate on which an original is placed, an illumination portion that illuminates the original through the original reading plate, and a reading portion that reads the original through the original reading plate. The original reading plate is a glass plate or the like. For example, the illumination portion has a plurality of light-emitting elements provided in rows, and the rows of the light-emitting elements are arranged along a direction (main scanning direction) in which the reading portion scans, and light from the light-emitting elements is irradiated onto the original through the original reading plate. The reading portion has a line sensor such as a CCD arranged along the main scanning direction, and light reflected by the original is incident on the line sensor through the original reading plate such that the original is read by the line sensor.

For example, the illumination portion and the reading portion are arranged below the original reading plate, and while the original is transported in a sub scanning direction on the original reading plate, light from the light-emitting elements of the illumination portion is irradiated onto the original and the original is read repetitively in the main scanning direction by the line sensor.

Incidentally, sometimes paper dust of the original adheres to a surface of the original reading plate. When paper dust is left on the surface of the original reading plate, the reading portion repetitively reads the paper dust of the surface of the original reading plate along with the original, and streaks are produced that extend in the sub scanning direction on the image that is read by the reading portion, then these streaks appear on the reproduced original. For this reason, when users or service personnel discover streaks on the reproduced originals, the surface of the original reading plate is cleaned with a cloth to remove the paper dust.

Furthermore, in JP 2002-258545A for example, a cleaning roller is arranged on a contact glass (corresponding to the original reading plate), and a cleaning portion and a reflective portion are provided at a peripheral surface of the cleaning roller. During reading of the original, the reflective portion of the cleaning roller is faced toward the contact glass, then while the original is passed between the contact glass and the cleaning roller, the original is illuminated by the lamp through the contact glass, and the original is read by the line sensor. Furthermore, when carrying out reading using the line sensor without causing the original to travel, artifacts on the surface of the contact glass are detected and the cleaning roller is caused to rotate to clean the surface of the contact glass using the cleaning portion of the cleaning roller.

However, when detection of paper dust on the surface of the original reading plate is dependent on the discovery of streaks on the reproduced originals by a user or service personnel, sometime this discovery is delayed and streaks are produced on a great number of reproduced originals.

Furthermore, in a case where uniform illumination is carried out using a lamp and artifacts on the contact glass are detected using a line sensor as in the foregoing JP 2002-258545A, the artifacts can be detected without problem as long as the artifacts are ink, but when the artifacts are paper dust, detection of paper dust is difficult since paper dust is white and the background of locations for reading the original are also white. Further still, a cleaning roller and a drive mechanism thereof are required, which increases the number of components and makes the configuration more complicated.

SUMMARY OF THE INVENTION

The present invention provides an image reading apparatus and an image forming apparatus provided with this that are capable of reliably and swiftly carrying out detection of paper dust on the surface of a transparent original reading plate.

An image reading apparatus according to the present invention is provided with a reading portion that reads a transported original through a transparent original reading plate, an illumination portion that has a plurality of light-emitting elements for illuminating the original provided in at least one row in a reading-scanning direction of the reading portion, and that illuminates the original through the original reading plate, a light emission control portion that performs control to selectively turn on or turn off each of the light-emitting elements of the illumination portion, and a foreign matter detection portion that detects foreign matter on a surface of the original reading plate based on output of the reading portion by having the light emission control portion perform control to selectively turn on or turn off each of the light-emitting elements.

Furthermore, when one of light-emitting elements adjacent to each other has been turned on and the other of the light-emitting elements has been turned off by the light emission control portion, the foreign matter detection portion may detect foreign matter on the surface of the original reading plate based on output of the reading portion corresponding to light of the one of the light-emitting elements that has been turned on.

Further still, the foreign matter detection portion may detect foreign matter on the surface of the original reading plate by comparing an output level of the reading portion corresponding to light of the turned-on one light-emitting element against a preset reference output level.

Furthermore, the light emission control portion may perform control to selectively turn on or turn off each of the light-emitting elements of the illumination portion so that pairings of a turned-on light-emitting element and a turned-off light-emitting element adjacent to each other are shifted in the row of the light-emitting elements of the illumination portion.

Further still, the light emission control portion may sequentially turn on each of the light-emitting elements of the illumination portion one by one and turn off the turned-on light-emitting element each time, thereby shifting the position of the turned-on light-emitting element in the row of the light-emitting elements of the illumination portion.

Further still, the light emission control portion may sequentially turn on each of the light-emitting elements of the illumination portion one by one and keep the light-emitting elements turned on.

Further still, after turning on each of the light-emitting elements of the illumination portion, the light emission control portion may sequentially turn off each of the light-emitting elements one by one and again turn on the turned-off light-emitting element each time, thereby shifting the position of the turned-off light-emitting element in the row of the light-emitting elements of the illumination portion.

Furthermore, after turning on each of the light-emitting elements of the illumination portion, the light emission control portion may sequentially turn off each of the light-emitting elements one by one and keep the light-emitting elements turned off.

Further still, after turning on each of the light-emitting elements of the illumination portion, the light emission control portion may sequentially select and turn off pair by pair light-emitting elements adjacent to each other and again turn on the turned-off light-emitting element each time.

Furthermore, the light emission control portion may alternately turn on and turn off odd-numbered light-emitting elements and even-numbered light-emitting elements of the illumination portion.

Further still, when the odd-numbered light-emitting elements of the illumination portion have been turned on and the even-numbered light-emitting elements have been turned off by the light emission control portion, the foreign matter detection portion may detect foreign matter on the surface of the original reading plate based on output of the reading portion corresponding to light of the odd-numbered light-emitting elements and, when the even-numbered light-emitting elements of the illumination portion have been turned on and the odd-numbered light-emitting elements have been turned off by the light emission control portion, it may detect foreign matter on the surface of the original reading plate based on output of the reading portion corresponding to light of the even-numbered light-emitting elements.

Furthermore, the reading portion may be provided with a photoelectric converter that performs photoelectric conversion on incident light, and an analog-digital converter that converts an analog signal of the photoelectric converter to a digital signal, and the foreign matter detection portion may detect foreign matter on the surface of the original reading plate based on the digital signal outputted from the analog-digital converter.

Furthermore, a reading position varying portion may be provided that, when foreign matter on the surface of the original reading plate is detected by the foreign matter detection portion, causes the reading portion to move.

Further still, an original detection portion may be provided that detects an original that has been set in an original tray, and the light emission control portion and the foreign matter detection portion may operate in response to detection output of the original detection portion.

On the other hand, an image forming apparatus according to the present invention is provided with an image reading apparatus according to the present invention described above.

In this image forming apparatus, a display portion may be provided that displays to an effect prompting cleaning of the original reading plate when foreign matter on the surface of the original reading plate is detected by the foreign matter detection portion.

Further still, a display portion may be provided that displays to an effect prompting cleaning of the original reading plate when foreign matter on the surface of the original reading plate is detected by the foreign matter detection portion even after movement of the reading portion by the reading position varying portion is carried out from one time to multiple times.

With an image reading apparatus according to the present invention, the light emission control portion performs control to selectively turn on or turn off each of the light-emitting elements and the foreign matter detection portion detects foreign matter on the surface of the original reading plate based on output of the reading portion.

Here, in a case where white foreign matter (for example, paper dust) has adhered to the original reading plate, when all the light-emitting elements are turned on, the beams of the plurality of light-emitting elements are irradiated onto the paper dust from their respective directions and no paper dust shadow is produced, and since the background of reading locations of the original are also white, the paper dust and the background are not easily distinguished, and paper dust detection is difficult.

However, when the light-emitting elements are selectively turned on or turned off as in the present invention, the beam from the selectively turned-on light-emitting elements is irradiated onto the paper dust from one direction, thereby producing a shadow of paper dust, and therefore the foreign matter detection portion can detect a shadow of the paper dust based on output of the reading portion, that is, it can detect paper dust on the surface of the original reading plate.

For example, when one of light-emitting elements adjacent to each other is turned on and the other is turned off by the light emission control portion, light from the turned-on light-emitting element is irradiated onto the paper dust from one direction to produce a paper dust shadow in the region between these light-emitting elements, and therefore foreign matter on the surface of the original reading plate can be detected based on the output of the reading portion corresponding to the light of the one light-emitting element that is turned on, that is, based on the output of the reading portion that has read the shadow of the paper dust.

Furthermore, when a shadow of paper dust is produced, the output of the reading portion that reads the shadow fluctuates, and therefore it is possible to detect paper dust on the surface of the original reading plate by comparing the output level of the reading portion against a preset reference output level.

Furthermore, pairings of ON light-emitting elements and OFF light-emitting elements adjacent to each other are shifted in the rows of the light-emitting elements of the illumination portion. In this way, a shadow of the paper dust is produced when paper dust is present in any reading location of the reading portion, thereby enabling detection of paper dust.

In shifting the pairings of ON light-emitting elements and OFF light-emitting elements adjacent to each other, for example, each light-emitting element of the illumination portion is sequentially turned on one by one and the turned-on light-emitting element is turned off each time such that the position of the ON light-emitting element shifts in the row of the light-emitting elements of the illumination portion. Alternatively, each of the light-emitting elements of the illumination portion may be turned on sequentially one by one and the turned-on state of the light-emitting elements is maintained. Furthermore, after turning on each of the light-emitting elements of the illumination portion, each of the light-emitting elements may be sequentially turned off one by one and the turned-off light-emitting element may be again turned on each time, thereby shifting the position of the turned-off light-emitting element in the row of the light-emitting elements of the illumination portion, and, after turning on each of the light-emitting elements of the illumination portion, each of the light-emitting elements may be sequentially turned off one by one and the turned-off state of the light-emitting elements may be maintained. Further still, after turning on each of the light-emitting elements of the illumination portion, it is possible to sequentially select and turn off pair by pair light-emitting elements that are adjacent to each other and again turn on the turned-off light-emitting element each time.

Furthermore, it is possible to alternately turn on and turn off odd-numbered light-emitting elements and even-numbered light-emitting elements of the illumination portion. In this case, if a configuration is such that when the odd-numbered light-emitting elements of the illumination portion have been turned on and the even-numbered light-emitting elements have been turned off, paper dust on the surface of the original reading plate is detected based on output of the reading portion corresponding to light of the odd-numbered light-emitting elements, and when the even-numbered light-emitting elements of the illumination portion have been turned on and the odd-numbered light-emitting elements have been turned off, paper dust on the surface of the original reading plate is detected based on output of the reading portion corresponding to light of the even-numbered light-emitting elements, then a paper dust shadow is produced for paper dust in any reading location of the reading portion to enable detection of paper dust. That is, paper dust can be detected in the reading range of the reading portion by carrying out reading with the reading portion only two times.

Furthermore, the reading portion may be provided with a photoelectric converter that performs photoelectric conversion on incident light, and an analog-digital converter that converts an analog signal of the photoelectric converter to a digital signal, and the foreign matter detection portion may detect paper dust on the surface of the original reading plate based on the digital signal outputted from the analog-digital converter. Accordingly, paper dust can be detected according to digital arithmetic processing using a CPU or the like.

Furthermore, when paper dust is detected on the original reading plate, the reading portion may be moved. In this way, paper dust is avoided and reading can be carried by the reading portion.

Furthermore, the light emission control portion and the foreign matter detection portion operate in response when an original that has been set in the original tray is detected, and therefore paper dust detection can be carried out at appropriate timings.

On the other hand, an image forming apparatus according to the present invention is provided with an image reading apparatus according to the present invention described above, and therefore an equivalent effect is achieved.

With the image forming apparatus, when paper dust on the surface of the original reading plate is detected, a message may be displayed immediately to an effect prompting cleaning of the original reading plate. In this way, notification can be given of timings for cleaning the original reading plate.

Furthermore, when paper dust is detected on the surface of the original reading plate even after moving the reading portion from one time to multiple times, then it is assumed that paper dust is adhering to a wide range of the original reading plate, and therefore a message is displayed on the display portion to an effect prompting cleaning of the original reading plate. In this way, the original reading plate is cleaned at appropriate timings without repetitively moving the reading portion to no purpose.

BRIEF DESCRIPTION OF THE DRAWINGS

FIG. 15 is a diagram showing a pattern of turning on or turning off in which each LED of an LED array is sequentially turned on one by one and the turned-on LEDs are kept turned on.

DESCRIPTION OF THE PREFERRED EMBODIMENTS

Hereinafter, embodiments of the present invention are described in detail with reference to the accompanying drawings.

Figure 1:
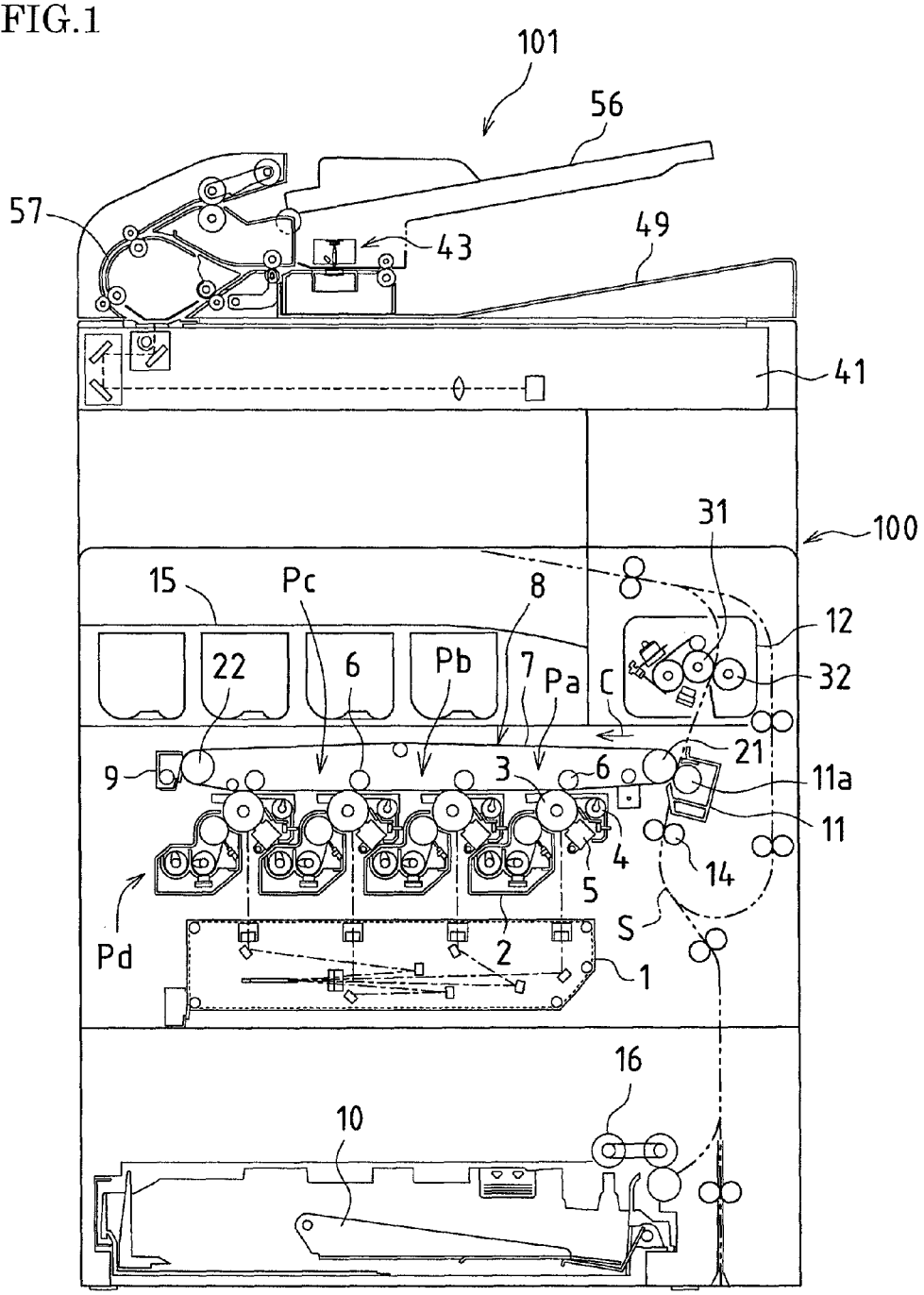
FIG. 1 is a cross-sectional view showing an image forming apparatus in which one embodiment of an image reading apparatus according to the present invention has been applied.

FIG. 1 is a cross-sectional view showing an image forming apparatus in which a first embodiment of an image reading apparatus according to the present invention has been applied. An image forming apparatus 100 is provided with components such as a laser exposing apparatus 1, a development apparatus 2, a photosensitive drum 3, a charging unit 5, a cleaner apparatus 4, an intermediate transfer belt apparatus 8, a fixing apparatus 12, a paper transport path S, a paper feed tray 10, and a paper discharge tray 15, and is configured to record and form on a recording paper, in color or a single color, an image of an original that has been read by an image reading apparatus 101, which is installed at an upper area of the main unit of the image forming apparatus 100, or an image that has been received externally.

Image data handled in the image forming apparatus 100 corresponds to color images using each of the colors black (K), cyan (C), magenta (M), and yellow (Y), or corresponds to a monochrome image using a single color (for example, black). Accordingly, four sets each of the development apparatus 2, the photosensitive drum 3, the charging unit 5, and the cleaner apparatus 4 are provided to form four latent images corresponding to the four colors, with these being associated with black, cyan, magenta, and yellow respectively, thereby constituting four image stations Pa, Pb, Pc, and Pd.

The photosensitive drums 3 are arranged substantially at a center of the image forming apparatus 100.

The charging units 5 are charging means for uniformly charging the surface of the photosensitive drums 3 to a predetermined electric potential and in addition to contact types such as roller and brush charging units, charger-type charging units can be used.

The laser exposing apparatus 1 is a laser scanning unit (LSU) provided with a laser diode and reflector mirrors, and exposes the surfaces of the charged photosensitive drums 3 in response to image data such that electrostatic latent images are formed on the surfaces corresponding to the image data.

The development apparatuses 2 develop the electrostatic latent images formed on the photosensitive drums 3 using (K, C, M, and Y) toner, thereby forming toner images on the surfaces of the photosensitive drums 3. The cleaner apparatuses 4 remove and collect toner that is residual on the surfaces of the photosensitive drums 3 after development and image transfer.

The intermediate transfer belt apparatus 8 positioned above the photosensitive drums 3 is provided with an intermediate transfer belt 7, an intermediate transfer belt drive roller 21, an idler roller 22, an intermediate transfer roller 6, and an intermediate transfer belt cleaning device 9.

The intermediate transfer belt 7 spans in a tensioned state and is supported by the intermediate transfer belt drive roller 21, the intermediate transfer rollers 6, and the idler roller 22, which cause the intermediate transfer belt 7 to move around in a direction of arrow C.

The intermediate transfer rollers 6 are rotatably supported near the intermediate transfer belt 7, and is pressed against the photosensitive drums 3 through the intermediate transfer belt 7, and also is supplied with a transfer bias such that the toner images on the surfaces of the photosensitive drums 3 are transferred to the intermediate transfer belt 7. The intermediate transfer rollers 6 are based on metal (for example stainless steel) axles with a diameter of 8 to 10 mm and the surfaces thereof are covered by a conductive elastic material (for example, EPDM and urethane foam or the like). With this conductive elastic material, it is possible to uniformly apply a high voltage to a recording paper.

The intermediate transfer belt 7 is arranged so as to contact each of the photosensitive drums 3 and forms a color toner image (toner images of each color) by successively superimposing and transferring the toner image on the surface of each of the photosensitive drums 3 onto the intermediate transfer belt 7. The transfer belt is formed as an endless belt using a film of a thickness in a range of 100 μm to 150 μm.

As described above, the toner image on the surface of each of the photosensitive drums 3 is layered onto the intermediate transfer belt 7 to become a color toner image indicated by image data. The layered toner image of each color is transported with the intermediate transfer belt 7 then transferred onto a recording paper by a transfer roller 11a of a secondary transfer apparatus 11 that is in contact with the intermediate transfer belt 7.

The intermediate transfer belt 7 and the transfer roller 11a of the secondary transfer apparatus 11 press against each other to form a nip region. Furthermore, a voltage (a (+) high voltage that has opposite polarity to the (−) charge polarity of the toner) is applied to the transfer roller 11a of the secondary transfer apparatus 11 in order for the toner images of each color on the intermediate transfer belt 7 to be transferred to the recording paper. Further still, in order to steadily obtain the nip region thereof, either the transfer roller 11a of the secondary transfer apparatus 11 or the intermediate transfer belt drive roller 21 is provided as a hard material (a metal or the like) and the other of these is provided as a soft material such as an elastic roller (elastic rubber roller or foam resin roller or the like).

Furthermore, sometimes the toner images on the intermediate transfer belt 7 are not completely transferred onto the recording paper by the secondary transfer apparatus 11 and there is residual toner on the intermediate transfer belt 7, and this residual toner is a cause of mixed toner colors occurring at subsequent steps. For this reason, residual toner is removed and collected by the intermediate transfer belt cleaning apparatus 9. In the intermediate transfer belt cleaning apparatus 9, a cleaning blade is provided for example as a cleaning member that contacts the intermediate transfer belt 7 and removes residual toner, and the rear side of the intermediate transfer belt 7 is supported by the idler roller 22 at a position where the cleaning blade contacts the intermediate transfer belt.

The paper feed tray 10 is a tray for storing recording paper and is provided below the image forming apparatus 100 to supply the recording paper inside the tray.

An S-shaped paper transport path S is provided in the image forming apparatus 100 for sending the recording paper supplied from the paper feed tray 10 to the paper discharge tray 15 via the secondary transfer apparatus 11 and the fixing apparatus 12. Arranged along the paper transport path S are components such as a paper pickup roller 16, paper registration rollers 14, the fixing apparatus 12, and transport rollers that transport the recording papers.

The paper pickup roller 16 is provided at an end portion of the paper feed tray 10 and is a draw-in roller that supplies recording papers sheet by sheet from the paper feed tray 10 to the paper transport path S. The transport rollers are small-size rollers for facilitating and assisting the transport of the recording papers and a plurality of these are provided.

The paper registration rollers 14 temporarily stop the recording paper that has been transported in so as to align the leading edge of the recording paper, then provide well timed transport of the recording paper in accordance with the rotations of the photosensitive drums and the intermediate transfer belt 7 so that the color toner image on the intermediate transfer belt 7 is transferred to the recording paper at the nip region between the intermediate transfer belt 7 and the transfer roller 11a of the secondary transfer apparatus 11.

For example, the paper registration rollers 14 transport the recording papers based on detection output of a pre-registration detection switch (not shown in drawings) that detects a leading edge of the recording paper so that the leading edge of the color toner image on the intermediate transfer belt 7 matches the leading edge of the image formation region of the recording paper at the nip region between the intermediate transfer belt 7 and the transfer roller 11a of the secondary transfer apparatus 11.

The fixing apparatus 12 is provided with components such as a heat roller 31 and a pressure roller 32. The heat roller 31 and the pressure roller 32 sandwich and transport the recording paper that has passed through the nip region between the intermediate transfer belt 7 and the transfer roller 11a of the secondary transfer apparatus 11.

The heat roller 31 is controlled by a control portion based on detection output from an unshown temperature detector so as to reach a predetermined fixing temperature, and has a function of melting, mixing, and pressing the toner image that has been transferred onto the recording paper to thermally fix it to the recording paper by applying thermocompression to the recording paper along with the pressure roller 32.

After the toner images of each color have been fixed, the recording paper is discharged face down on the paper discharge tray 15 by the transport rollers.

Figure 2:
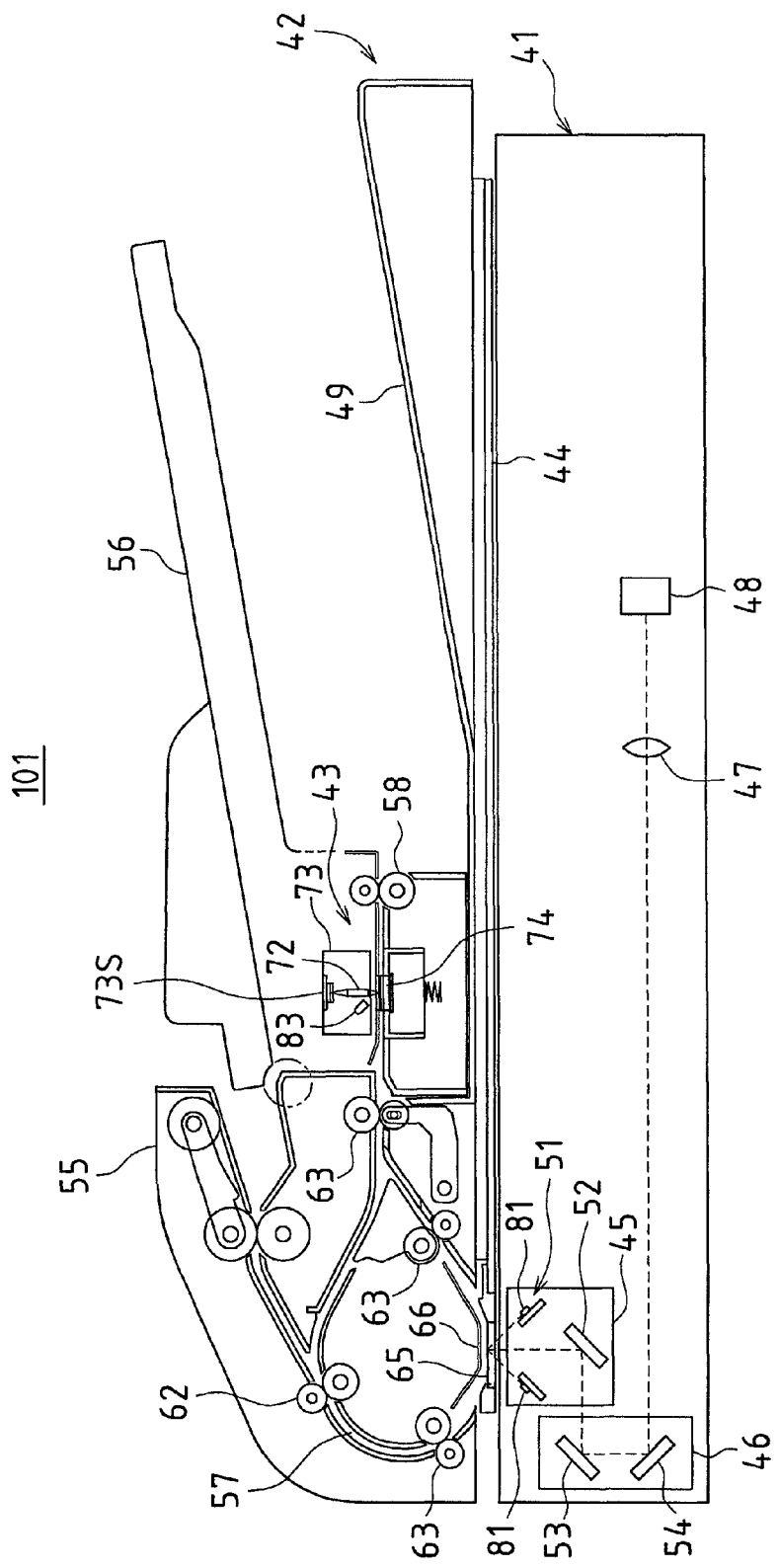
FIG. 2 is a cross-sectional view showing an image reading apparatus according to the present embodiment.

Next, description is given with reference to FIG. 2 of the image reading apparatus 101 according to the present embodiment, which is mounted on an upper area of the main unit of the image forming apparatus 100 of FIG. 1. FIG. 2 is a cross-sectional view showing an enlargement of the image reading apparatus 101.

The image reading apparatus 101 according to the present embodiment is provided with a first reading portion 41 on a lower side and an original transport portion 42 on an upper side.

One back side of the original transport portion 42 on the upper side is pivotably supported by a hinge (not shown in drawings) on one back side of the first reading portion on the lower side, and a front area of the original transport portion 42 can be opened and closed by being raised or lowered. When the original transport portion 42 is open, a glass platen 44 of the lower side first reading portion 41 is uncovered, and an original can be placed on this glass platen 44.

The first reading portion 41 is provided with components such as the glass platen 44, a first scanning unit 45, a second scanning unit 46, an imaging lens 47, and a CCD (charge coupled device) 48. While the first scanning unit 45, which is provided with an illumination portion 51 and a first reflector mirror 52, moves in the sub scanning direction at a constant velocity V for a distance corresponding to the size of the original, the original on the glass platen 44 is exposed by LED arrays 81 of the illumination portion 51, and the reflected light thereof is reflected by the first reflector mirror 52 and guided to the second scanning unit 46, and in this way an image of the front surface of the original is scanned in the sub scanning direction. While the second scanning unit 46, which is provided with second and third reflector mirrors 53 and 54, moves at a velocity V/2 following the first scanning unit 45, the reflected light of the original is reflected by the second and third reflector mirrors 53 and 54 and guided to the imaging lens 47. The imaging lens 47 focuses the reflected light of the original onto the CCD 48 such that an image of the front surface of the original is formed on the CCD 48. The CCD 48 repetitively scans the image of the original in the main scanning direction and at each scan it outputs analog image signals of one main scanning line.

Pulleys (not shown in drawings) are provided at the first and second scanning units 45 and 46 respectively, and wires (not shown in drawings) extend between these pulleys, with these wires being driven by a stepping motor such that the first and second scanning units 45 and 46 are caused to move in synchronization.

Furthermore, in addition to stationary originals, the lower side first reading portion 41 is also capable of reading an image of the surface of an original that is being transported by the original transport portion 42. In this case, the first scanning unit 45 is moved to a reading position below an original reading glass 65 as shown in FIG. 2, and the second scanning unit 46 is positioned in response to the position of the first scanning unit 45, then, in this state, transport commences of the original by the original transport portion 42.

In the original transport portion 42, a pickup roller 55 is pressed against the originals on the original tray 56 and caused to rotate to pull out an original so that the original is transported through the original transport path 57, then the original is caused to travel between the original reading glass 65 and a reading guide plate 66 of the first reading portion 41, then the original is further transported through the second reading portion 43 then from a paper discharge roller 58 to a paper discharge tray 49. Registration rollers 62, which align a leading edge of the original for transport, and transport rollers 63, which transport the original, are arranged along the original transport path 57.

During the transport of this original, the front surface of the original is illuminated through the original reading glass 65 by the LED arrays 81 of the illumination portion 51 of the first scanning unit 45, and reflected light from the front surface of the original is guided to the imaging lens 47 by the reflector mirrors of the first and second scanning units 45 and 46, then the reflected light from the front surface of the original is focused on the CCD 48 by the imaging lens 47 such that an image of the front surface of the original is formed on the CCD 48, and in this way an image of the front surface of the original is read.

Furthermore, it is possible for an image of a back surface of the original to be read by a second reading portion 43 installed in the original transport portion 42 at the same time as reading an image of the front surface of the original being transported by the original transport portion 42. The second reading portion 43 is arranged above the glass platen 44 and is provided with a contact image sensor (hereinafter referred to as a CIS) 73 and a first glass plate 74, between which the original travels. The CIS 73 is provided with an LED array 83 that illuminates a back surface of the original, a SELFOK (registered trademark) lens array 72 that focuses the reflected light of the original for each pixel, and a line sensor 73S that performs photoelectric conversion on the reflected light of the original received via the SELFOK lens array 72 and outputs an analog image signal. The original that has traveled over the original reading glass 65 of the first reading portion 41 travels over the first glass plate 74 of the second reading portion 43 and is discharged to the paper discharge tray 49, but while traveling over the first glass plate 74, the back surface of the original is illuminated by the LED array 83 such that reflected light from the back surface of the original is incident on the line sensor 73S through the SELFOK lens array 72, and an image of the back surface of the original is read by the line sensor 73S.

The images of the original that have been read by the CCD 48 and the CIS 73 are outputted as analog image signals from the CCD 48 and the CIS 73, and these analog image signals undergo A/D conversion to digital image signals. Then, these digital signals are transmitted to the laser exposing apparatus 1 of the image forming apparatus 100 after undergoing various types of image processing, and the image is recorded onto a recording paper in the image forming apparatus 100, then the recording paper is outputted as a reproduced original.

In this regard, in the image reading apparatus 101, since the originals travel over the original reading glass 65 of the first reading portion 41, sometimes white foreign matter (for example, paper dust) adheres to the surface of the original reading glass 65. When paper dust is left on the surface of the original reading glass 65, the CCD 48 repetitively reads the paper dust on the surface of the original reading glass 65 along with the image of the original, and streaks are produced that extend in the sub scanning direction on the image that is read, then these streaks appear on the reproduced original.

For this reason, as shown in FIG. 2, in a state in which the first scanning unit 45 is moved to a reading position below the original reading glass 65 and the second scanning unit 46 is moved to be positioned in place, and the original is not caused to travel between the original reading glass 65 and the reading guide plate 66, reading is carried out by the CCD 48 and detection is performed for paper dust adhering to the surface of the original reading glass 65 based on the output of the CCD 48.

Figures 3A, 3B:
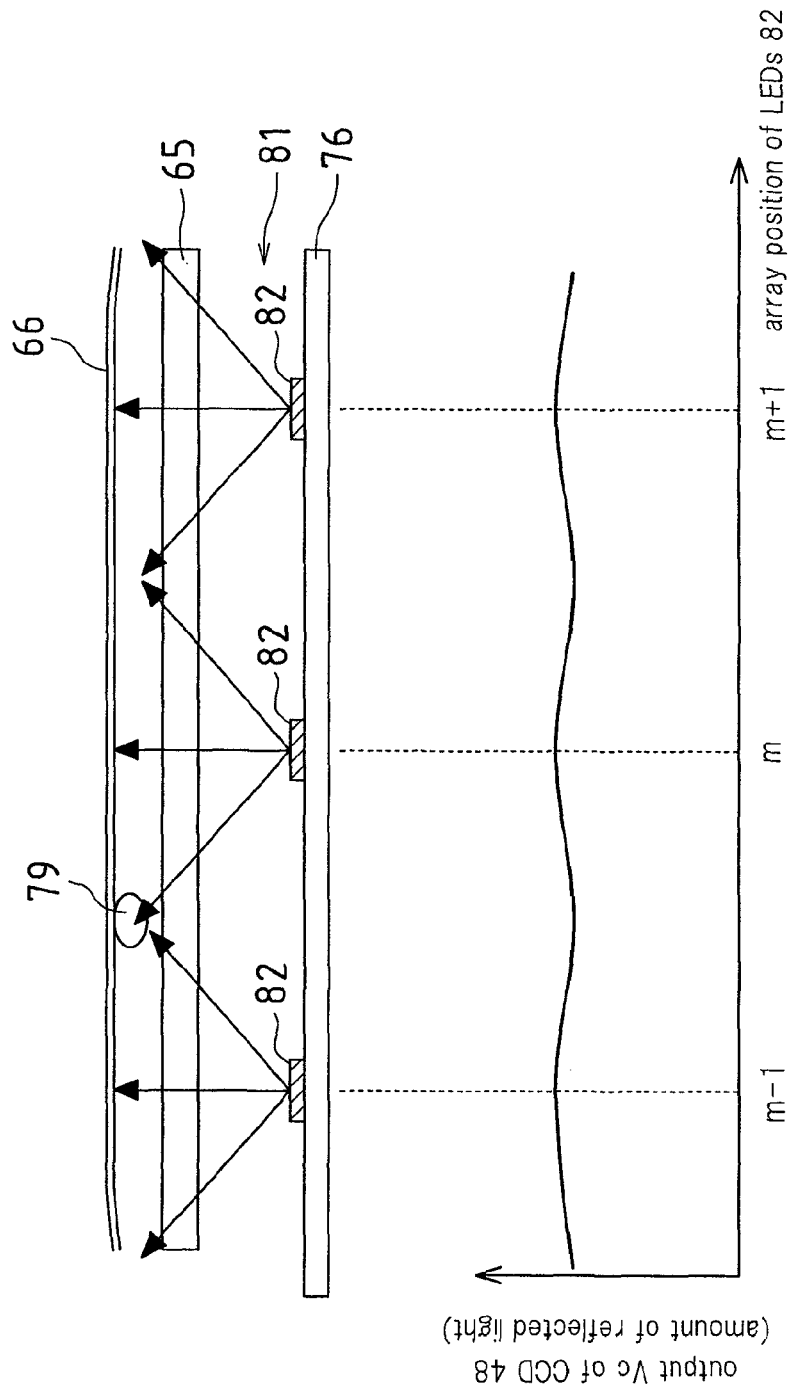
FIG. 3A is a diagram showing an illumination state with respect to paper dust when all LEDs of an LED array of a first scanning unit in the image reading apparatus are turned on, and FIG. 3B is a graph showing an output Vc of the CCD of a first reading portion.

However, paper dust is white and the reading guide plate 66, which is a background of reading locations of the original, is also white, and therefore if all LEDs 82 of the LED array 81 of the illumination portion 51 are turned on in a same manner as during image reading of an original as shown in FIG. 3A, beams from the plurality of LEDs 82 are irradiated from their respective directions onto a paper dust 79 on the surface of the original reading glass 65, and a boundary between the paper dust 79 and the reading guide plate 66 becomes indistinct such that the paper dust 79 and the reading guide plate 66 are read by the CCD 48 as a substantially uniform white image, and no conspicuous variation appears in an output Vc of the CCD 48, which indicates this white image as shown in FIG. 3B, and it becomes difficult to detect the paper dust 79 based on the output Vc of the CCD 48.

Accordingly, in the present embodiment, each of the LEDs 82 of the illumination portion 51 of the first scanning unit 45 is selectively turned on or turned off to produce a shadow of the paper dust, and the paper dust is detected based on variation of the output Vc of the CCD 48 corresponding to the shadow of the paper dust.

It should be noted that paper dust adheres also to the surface of the glass platen 44, but since the original is placed on the glass platen 44 and the first and second scanning units 45 and 46 move in the sub scanning direction, the paper dust appears only in a spot manner in the image read by the CCD 48, and the influence of this paper dust is small. For this reason, detection is not carried out for paper dust on the surface of the glass platen 44.

Next, description is given of a configuration for detecting paper dust based on variation of the output Vc of the CCD 48 by performing control to selectively turn on or turn off each of the LEDs 82 of the illumination portion 51.

Figure 4:
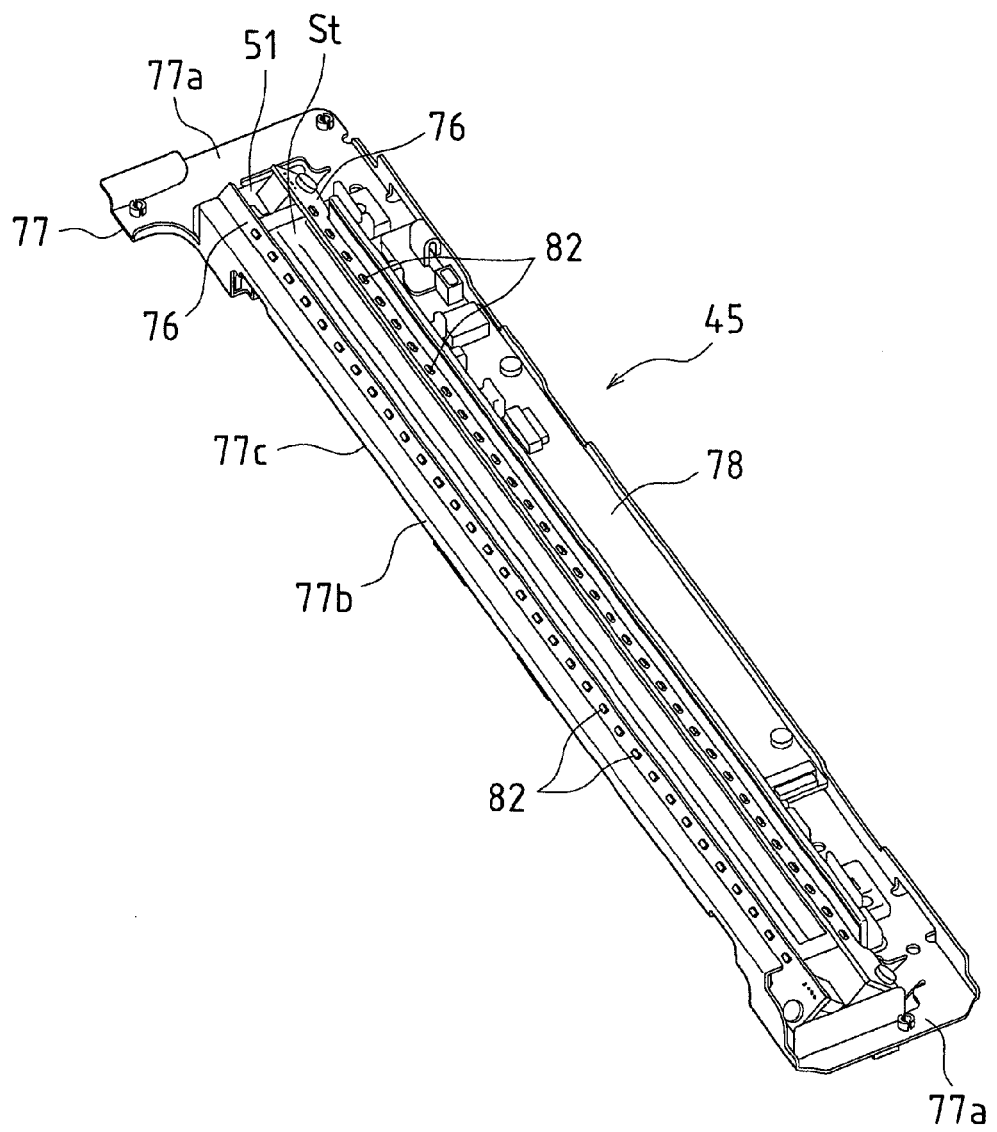
FIG. 4 is a perspective view showing the first scanning unit in the image reading apparatus.

First, description is given of a configuration of the first scanning unit 45. FIG. 4 is a perspective view showing the first scanning unit 45. Furthermore, FIG. 5 is a cross-sectional view showing the first scanning unit 45.

Figure 5:
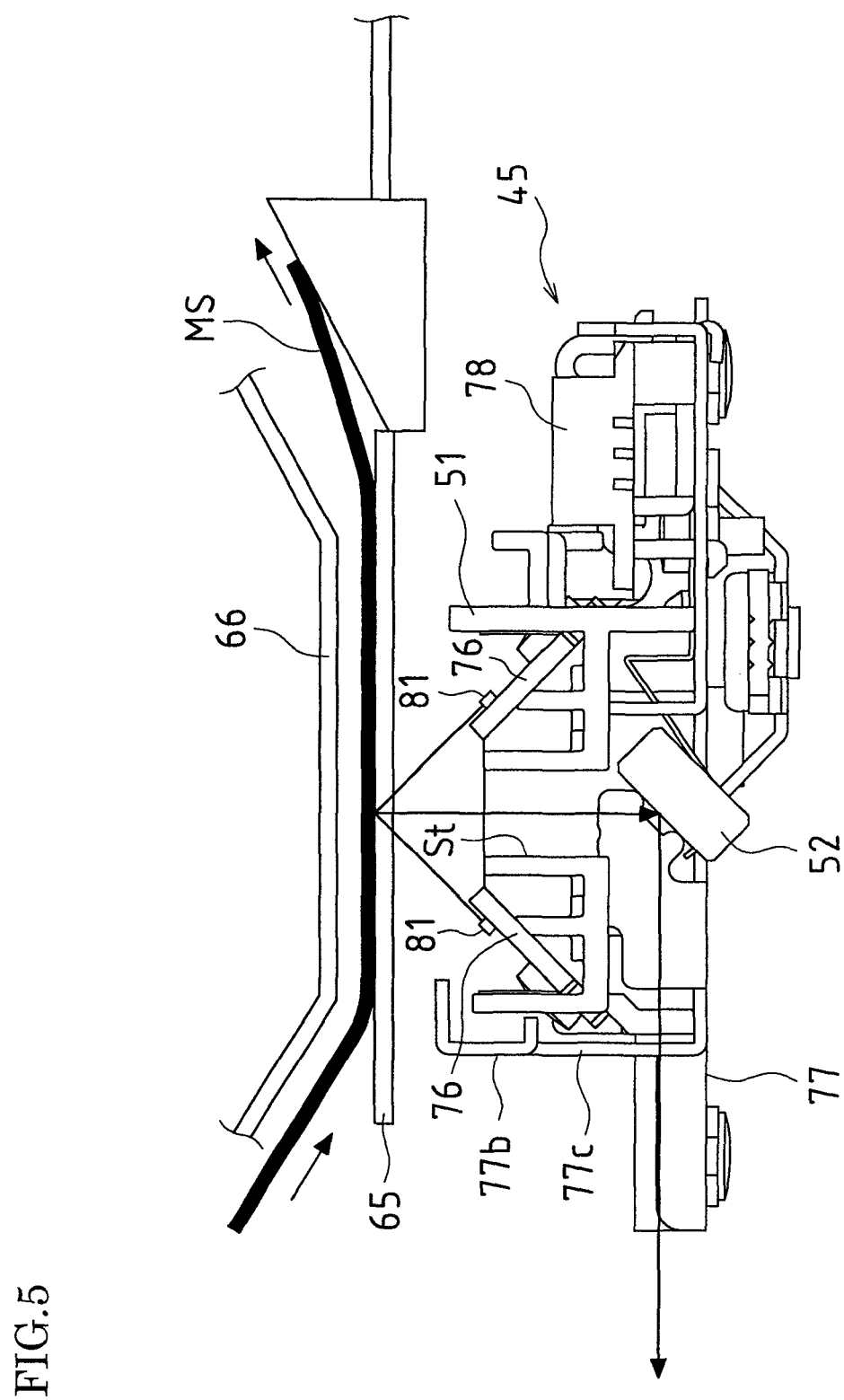
FIG. 5 is a cross-sectional view showing the first scanning unit of FIG. 4 as seen laterally.

As is evident from FIG. 4 and FIG. 5, the first scanning unit 45 is provided with a moving scanning frame 77 and the illumination portion 51 mounted on the moving scanning frame 77.

The moving scanning frame 77 moves and scans in the sub scanning direction, and its ends 77a are supported so as to allow it to readily slide, and as mentioned earlier, it is driven using pulleys, wires, and a stepping motor. Furthermore, the first reflector mirror 52 is provided on the moving scanning frame 77, and this first reflector mirror 52 is arranged along the main scanning direction and tilted at 45° with respect to the scanning surface (the surface of the original reading glass 65).

A front edge portion 77b of the moving scanning frame 77 is bent upwardly, and an open slit 77c is formed in the front edge portion 77b. Furthermore, a driver circuit 78 is mounted at a rear portion of the moving scanning frame 77.

The illumination portion 51 carries out illumination of the original and the like, and is provided with a slit St, and substrates 76 having an elongate shape that are parallel to each other are secured on lengthwise direction ends of the slit St.

Figure 6:
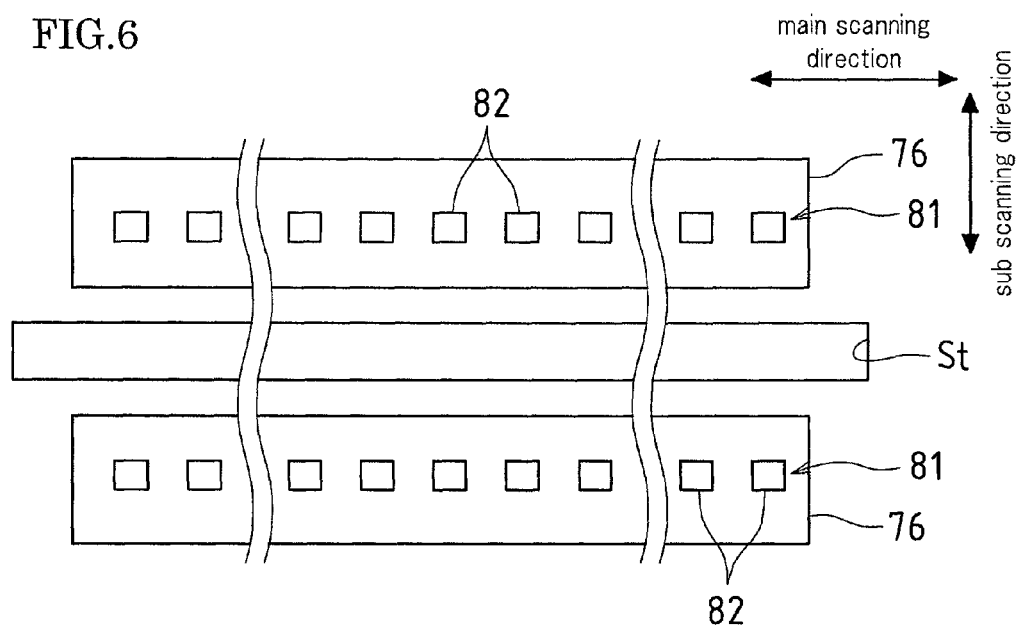
FIG. 6 is a plan view showing two rows of an LED array in the first scanning unit of FIG. 4.

As shown in FIG. 6, a LED array 81 constituted by a plurality of LEDs 82 is mounted on each of the substrates 76. Each of the LEDs 82 is connected to a wiring pattern of its respective substrate 76, and the wiring pattern of each of the substrates 76 is connected to the driver circuit 78 of the moving scanning frame 77 via a harness (not shown in drawings). The driver circuit 78 supplies power to each of the LEDs 82 via the harness and the wiring patterns of the substrates 76, and performs control to turn on and turn off each of the LEDs 82.

Figure 7:
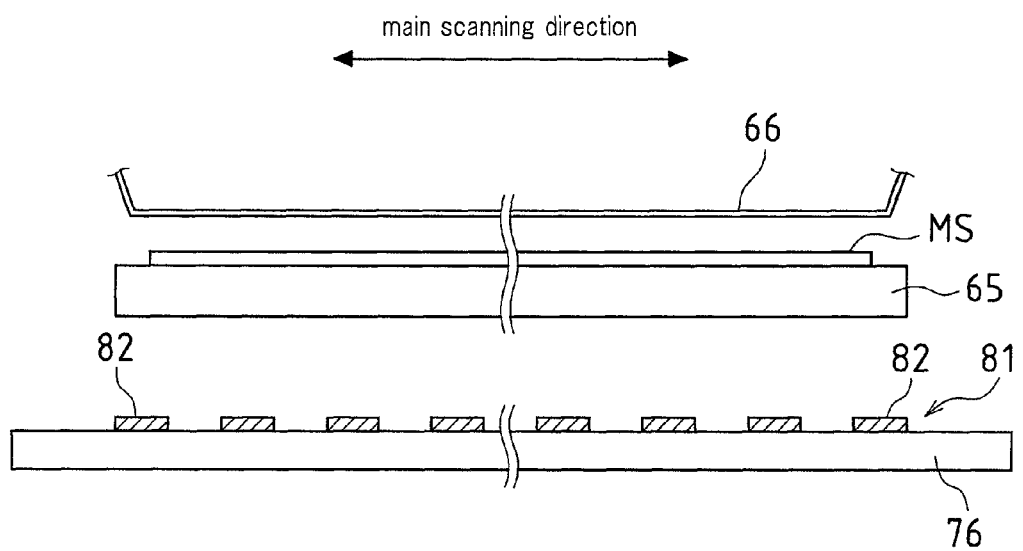
FIG. 7 is a cross-sectional view showing the first scanning unit of FIG. 4 as seen from a front side.

As is evident also from FIG. 7, the substrates 76 and the LED arrays 81 on the substrates 76 are provided along the main scanning direction, and beams from the LED arrays 81 are irradiated onto an original MS through the original reading glass 65.

Figure 8A:
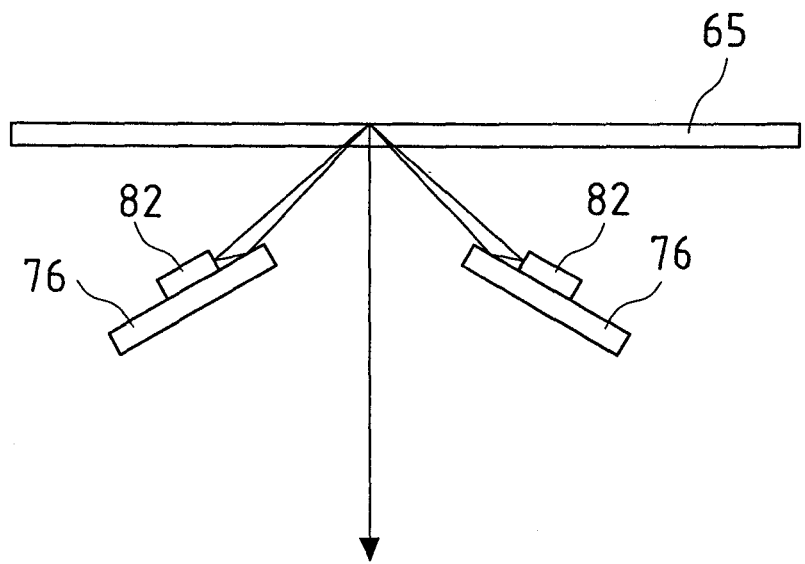
FIG. 8A is a cross-sectional view showing an illumination state by LED arrays on two substrates.
Figure 8B:
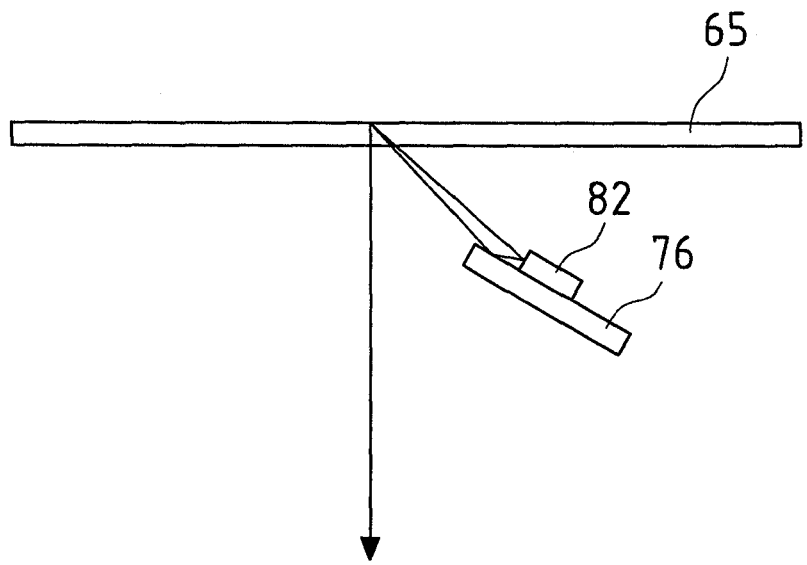
FIG. 8B is a cross-sectional view showing an illumination state by a LED array on one of the substrates.

Furthermore, since the surfaces of the substrates 76 are white, beams from the LEDs 82 are irradiated not only directly onto the original as shown in FIG. 8A, but beams reflected by the surfaces of the substrates 76 are also irradiated onto the original, thereby increasing the quantity of irradiated light onto the original. Further still, as shown in FIG. 8B, it is also possible to illuminate the original using only the LEDs 82 on one of the substrates 76.

As shown in FIG. 4 and FIG. 5, the first reflector mirror 52 is positioned directly below the slit St of the illumination portion 51, and when beams are emitted from the LEDs 82 of the substrates 76, the beams from the LEDs 82 are outputted upwardly and are irradiated onto the original MS through the glass platen 44 or the original reading glass 65, then the reflected light from the original MS is incident on the slit St through the glass platen 44 or the original reading glass 65, and this reflected light is incident on and reflected by the first reflector mirror 52 through the slit St, then the reflected light is outputted to the second reflector mirror 53 of the second scanning unit 46 through the open slit 77c of the front edge portion 77b of the moving scanning frame 77.

Figure 9:
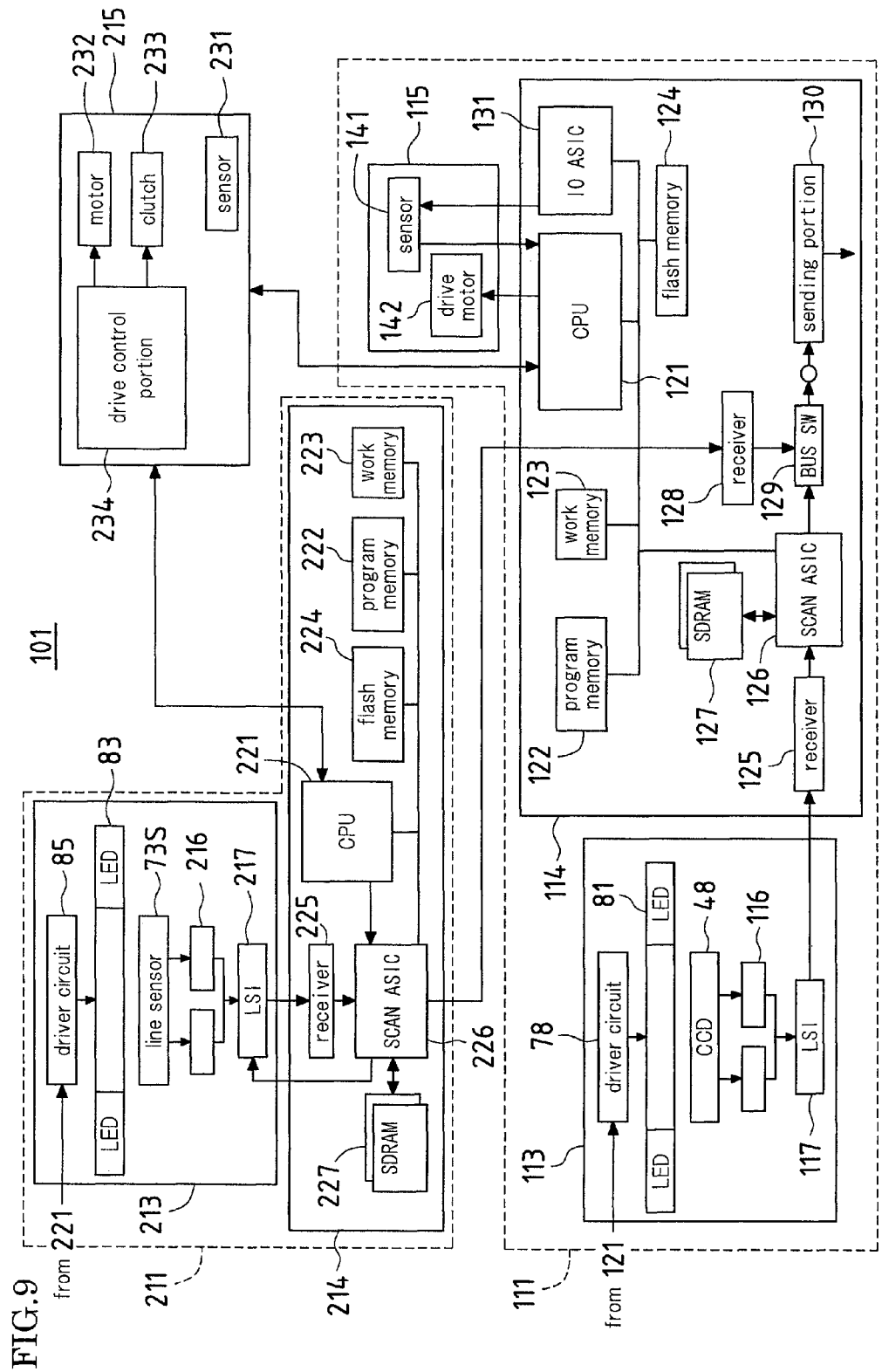
FIG. 9 is a block diagram showing a configuration of a signal processing system of the image reading apparatus.

FIG. 9 is a block diagram showing a configuration of a signal processing system of the image reading apparatus 101. As shown in FIG. 9, the image reading apparatus 101 is provided with a first image processing portion 111, a second image processing portion 211, and a transport drive portion 215. The first image processing portion 111 converts the analog image signals from the CCD 48 of the first reading portion 41 (shown in FIG. 2) to digital image signals, and carries out tasks such as executing various types of image processing on the digital image signals, performing drive control of the first and second scanning units 45 and 46 of the first reading portion 41, and performing transport control of the original by the original transport portion 42. Furthermore, the second image processing portion 211 converts the analog image signals from the CIS 73 of the second reading portion 43 (shown in FIG. 2) of the original transport portion 42 to digital image signals, and carries out tasks such as executing various types of image processing on the digital image signals and performing transport control of the original by the original transport portion 42. The digital image signals are exchanged from at least one of the first and second image processing portions 111 and 211 to the laser exposing apparatus 1 of the image forming apparatus 100 and an image is recorded onto a recording paper in the image forming apparatus 100.

The first image processing portion 111 is provided with a first sensor portion 113, which includes components such as the LED arrays 81 of the illumination portion 51 of the first scanning unit 45 and the CCD 48, a first computing portion 114, which inputs digital image signals from the first sensor portion 113 and executes various types of image processing on the digital image signals, and a scanning drive portion 115 that drives the first and second scanning units 45 and 46 of the first reading portion 41.

The first sensor portion 113 is provided with the LED arrays 81 of the illumination portion 51, the driver circuit 78 that performs control to selectively turn on and turn off each of the LEDs 82 of the LED arrays 81, the CCD 48, two analog frontend circuits (hereinafter referred to as AFEs) 116, which perform A/D conversion to convert the analog image signals from the CCD 48 to digital image signals, and an LSI 117, which includes a register that relays and transfers the digital image signals from each of the AFEs 116.

The first computing portion 114 is provided with a central processing unit (hereinafter referred to as CPU) 121 that performs overall control of the first image processing portion 111, a program memory 122 that contains programs executed by the CPU 121, a work memory 123 that is used by the CPU 121, a flash memory 124 that stores shading correction levels and the like, a receiver 125 that inputs digital image signals from the LSI 117 of the first sensor portion 113, a scan ASIC (application specific integrated circuit) 126 that inputs digital image signals from the receiver 125 and executes various types of image processing on the digital image signals, an SDRAM (synchronous DRAM) 127 that is used by the scan ASIC 126, a receiver 128 that inputs digital image signals from the second image processing portion 211, a sending portion 130 inputs digital image signals from the scan ASIC 126 or digital image signals from the second image processing portion 211 via a bus switch 129 and sends the inputted digital image signals to the laser exposing apparatus 1 of the image forming apparatus 100, and an IO ASIC 131 that controls input and output with respect to components such as sensors 141 of the scanning drive portion 115.

The scanning drive portion 115 is provided with a plurality of sensors 141 that detect positions of the first and second scanning units 45 and 46, and a drive motor 142 for driving the first and second scanning units 45 and 46. The CPU 121 of the first computing portion 114 controls the movement of the first and second scanning units 45 and 46 by performing drive control of the drive motor 142 while confirming the positions of the first and second scanning units 45 and 46, which are detected by the sensors 141.

The second image processing portion 211 is provided with a second sensor portion 213, which is constructed on the substrate on which the CIS 73 of the second reading portion 43 is mounted, and a second computing portion 214, which inputs digital image signals from the second sensor portion 213 and executes various types of image processing on the digital image signals.

The second sensor portion 213 is provided with the LED array 83 of the CIS 73, the driver circuit 85 that performs control to selectively turn on and turn off each of the LEDs 84 of the LED array 83, the line sensor 73S, two analog frontend circuits (hereinafter referred to as AFEs) 216, which perform A/D conversion to convert the analog image signals from the line sensor 73S to digital image signals, and an LSI 217, which includes a register that relays and transfers the digital image signals from each of the AFEs 216.

The second computing portion 214 is provided with a central processing unit (hereinafter referred to as CPU) 221 that performs overall control of the second image processing portion 211, a program memory 222 that contains programs executed by the CPU 221, a work memory 223 that is used by the CPU 221, a flash memory 224 that stores shading correction levels and the like, a receiver 225 that inputs digital image signals from the LSI 217 of the second sensor portion 213, a scan ASIC (application specific integrated circuit) 226 that inputs digital image signals from the receiver 225 and executes various types of image processing on the digital image signals, and an SDRAM (synchronous DRAM) 227 that is used by the scan ASIC 226.

The transport drive portion 215 is provided with a plurality of sensors 231 that detect a presence/absence of an original that has been set in the original tray 56 or the glass platen 44 and transport positions of an original in the original transport path 57 of the original transport portion 42, a motor 232 that rotationally drives components such as the pickup roller, the registration rollers, and the transport rollers of the original transport path 57, a clutch 233 that engages and disengages drive transmission paths between the rollers and the motor shafts, and a drive control portion 234 that performs drive control of the motor 232 and the clutch 233. Based on the detection output of the sensors 231, the CPU 121 of the first computing portion 114 or the CPU 221 of the second computing portion 214 performs drive control of the motor 232 and the clutch 233 through the drive control portion 234, and controls the transport of the original on the original transport path 57.

As described earlier, in the thus-configured image reading apparatus 101, in a state in which the first scanning unit 45 is moved to a reading position below the original reading glass 65 and the second scanning unit 46 is positioned in place, and the original is not caused to travel between the original reading glass 65 and the reading guide plate 66 of the first reading portion 41, the LEDs 82 of the illumination portion 51 of the first scanning unit 45 are controlled to be selectively turned on or turned off to produce a shadow of paper dust and reading is carried out by the CCD 48, then paper dust is detected based on the output of the CCD 48.

Specifically, the CPU 121 of the first computing portion 114 performs drive control of the drive motor 142 while confirming the positions of the first and second scanning units 45 and 46, which are detected by the sensors 141, and moves the first scanning unit 45 to the reading position below the original reading glass 65, and moves the second scanning unit 46 to be positioned in place.

Figure 10:
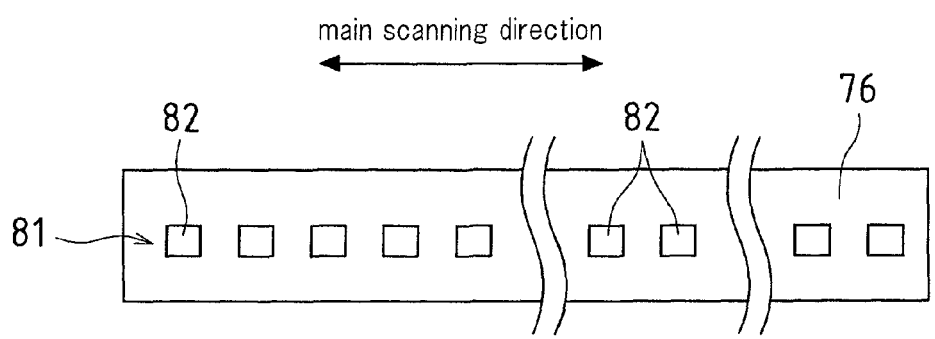
FIG. 10 is a diagram showing a pattern of turning on or turning off LEDs of the LED array in the first scanning unit.

Then, the CPU 121 selects an LED array 81 on one of the substrates 76 in the illumination portion 51 by way of the driver circuit 78, that is, it selects one row of the LED arrays 81 and performs control to selectively turn on and turn off the LEDs 82 in this LED array 81 and, as shown in FIG. 10, sequentially turns on each of the LEDs 82 one by one, then step by step turns off the LEDs 82 that have been turned on, thereby shifting the position of the turned-on LEDs 82. That is, pairings of an ON LED 82 and an OFF LED 82 that are adjacent are shifted in the LED array 81.

Further still, the CPU 121 causes the CCD 48 of the first sensor portion 113 to carry out one time of main scanning direction reading each time LEDs 82 are turned on or turned off in the above-described pattern. The output Vc of the CCD 48 is converted to digital signals by each of the AFEs 116, and these digital signals are inputted to the CPU 121 via the LSI 117, the receiver 125, and the scan ASIC 126. The CPU 121 detects a shadow of paper dust, that is, it detects paper dust, based on the digital signals that indicate the output Vc of the CCD 48.

Here, when a single LED 82 of the LED array 81 is turned on as shown in FIG. 10 in a state in which an original is not caused to travel between the original reading glass 65 and the reading guide plate 66 of the first reading portion 41, the beam of this LED 82 is reflected by the reading guide plate 66 near the LED 82.

Furthermore, a width of the main scanning line read by the CCD 48 is enlarged by the imaging lens 47 and is substantially equivalent to the main scanning direction width of the LED array 81. And the CCD 48 sequentially reads the tones of a plurality of pixels along the main scanning line and sequentially outputs respective output indicating the tone of each pixel.

Accordingly, when a single LED 82 of the LED array 81 is turned on as shown in FIG. 10, the CCD 48 reads the light reflected by the reading guide plate 66 near this LED 82 as tones of the plurality of pixels near the LED 82 in the main scanning line. For this reason, the respective output levels, which indicate tones of the plurality of pixels near the LED 82 in the main scanning line, fluctuate.

Figures 11A, 11B:
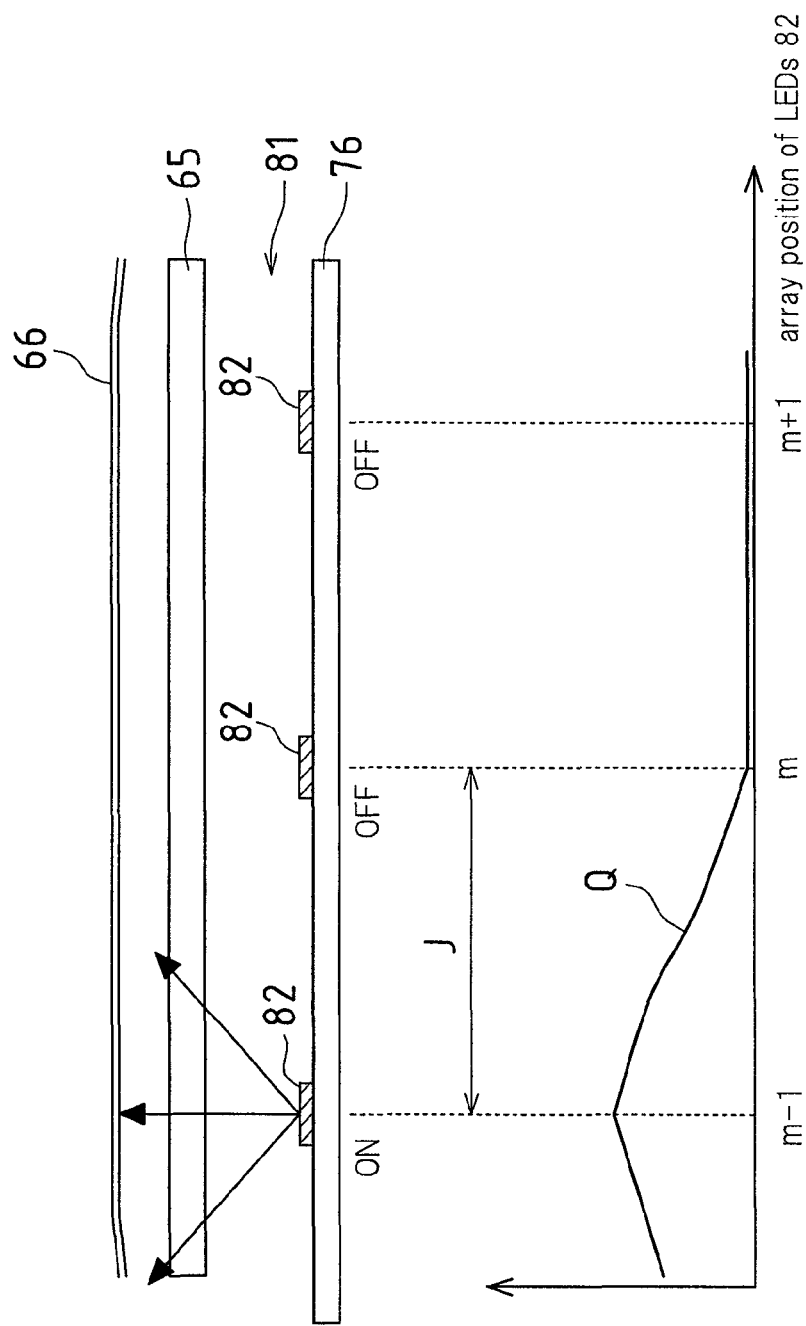
FIG. 11A is a diagram showing an illumination state of a reading guide plate in a region between an ON LED and an OFF LED of the first scanning unit.
FIG. 11B is a diagram showing output Vc of a CCD of the first reading portion in the region between the ON LED and the OFF LED of the first scanning unit.

For example, when an (m−1)th LED 82 in FIG. 10 and FIG. 11A is turned on, light of this LED 82 is reflected by the reading guide plate 66 near the (m−1)th LED 82, and this reflected light is read by the CCD 48 as tones of the plurality of pixels near this LED 82 in the main scanning line, and the respective output levels, which indicate tones of the plurality of pixels near the LED 82 in the main scanning line, fluctuate.

Furthermore, as shown in FIG. 11B, in a region J between the (m−1)th LED 82 and an mth LED 82, the light reflected by the reading guide plate 66 progressively decreases for greater distances in the main scanning direction from the (m−1)th LED 82. Thus, the output Vc of the CCD 48 is also highest for the closest pixel to the relevant LED 82 in the main scanning line and is progressively lower for pixels farther away from this LED 82.

On the other hand, in a case where the white paper dust 79 is adhering to the surface of the original reading glass 65 as shown in 12A, when the (m−1)th LED 82 is turned on, light of this LED 82 is reflected by the reading guide plate 66 and the white paper dust, and this reflected light is read by the CCD 48 as tones of the pixels near this LED 82 in the main scanning line, and the respective output levels, which indicate tones of the pixels near the LED 82 in the main scanning line, fluctuate.

Furthermore, since the mth LED 82 is turned off, no light is irradiated from the mth LED 82 onto the paper dust 79. Thus, when light from the (m−1)th LED 82 is incident on the paper dust 79 on the surface of the original reading glass 65, a shadow 79a of the paper dust 79 appears on the background reading guide plate 66. And as shown in FIG. 12B, the output Vc of the CCD 48 drops exceptionally in regard to the pixels in the main scanning line in which the shadow 79a of the paper dust 79 is read.

Figures 12A, 12B:
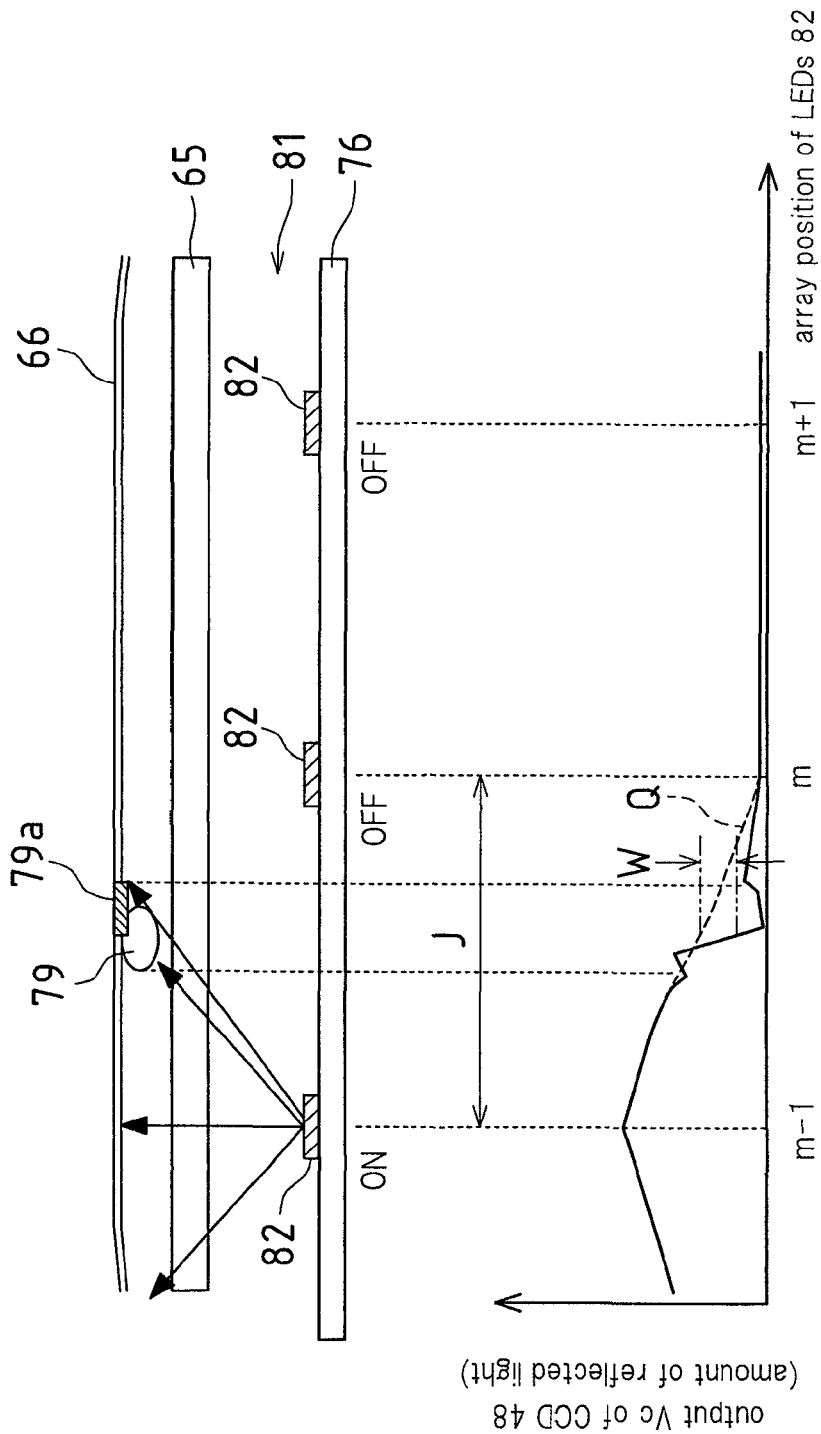
FIG. 12A is a diagram showing an illumination state of paper dust in the region between the ON LED and the OFF LED of the first scanning unit.
FIG. 12B is a diagram showing output Vc of the CCD of the first reading portion in the region between the ON LED and the OFF LED of the first scanning unit.

As is evident when comparing FIG. 11B and FIG. 12B, the output Vc of the CCD 48 corresponding to the pixels in the region J between the (m−1)th LED 82 and the mth LED 82 fluctuates according to whether or not the paper dust 79 is adhering to the surface of the original reading glass 65 in the region J.

Accordingly, the (m−1)th LED 82 is turned on and the mth LED 82 is turned off in a state in which the paper dust 79 is not adhering to the surface of the original reading glass 65 as shown in FIG. 11A, and the output Vc of the CCD 48 corresponding to the pixels in the region J are obtained in advance as shown in FIG. 11B, and the output Vc of these pixels is set and stored as a reference level Q of each pixel.

Then, when detecting for paper dust that has adhered to the surface of the original reading glass 65, the (m−1)th LED 82 is turned on and the mth LED 82 is turned off, and the output Vc of the CCD 48 corresponding to the pixels in the region J are obtained as shown in FIG. 12B, and the output Vc of these pixels is compared against the reference level Q of the pixels for each pixel. At this time, if the output Vc of any pixel drops by a preset prescribed level width W or more with respect to the reference level Q of that pixel, it can be considered that the shadow 79a of the paper dust 79 has been read at that pixel and the existence of the paper dust 79 can be determined.

Specifically, the CPU 121 causes the CCD 48 to carry out main scanning direction reading one time each time each of the LEDs 82 is sequentially turned on one by one as shown in FIG. 10, and inputs digital signals that indicate the output Vc of the CCD 48, then determines an existence of the paper dust 79 by performing arithmetic processing on these digital signals. More specifically, the CPU 121 extracts the output Vc of the CCD 48 corresponding to each pixel in the region J between the turned-on (m−1)th LED 82 and the turned-off mth LED 82 from the output Vc of one main scanning line portion, then compares the output Vc of the pixels against the reference level Q of that pixel for each pixel in the region J, and if the output Vc of any pixel has dropped by the prescribed level width W or more with respect to the reference level Q of that pixel, it determines paper dust is present, and if the output Vc of no pixel has dropped by the prescribed level width W or more with respect to the reference level Q of that pixel, it determines an absence of paper dust. In FIG. 12B, the output Vc of the CCD 48 corresponding to at least one pixel in the region J has dropped by the preset prescribed level width W or more with respect to the reference level Q of that pixel, and therefore it can be considered that the shadow of the paper dust 79 has been read at that pixel and the existence of the paper dust 79 can be determined.

The respective output Vc corresponding to each pixel in the one main scanning line portion is sequentially outputted from the CCD 48. Furthermore, in a case where the LEDs 82 of the LED array 81 are arranged with equally-spaced intervals, the number of pixels in any region J among the LEDs 82 is also a certain number. Thus, if the respective output Vc from the CCD 48 corresponding to the pixels is sectioned using the certain number, then by extracting the respective output Vc corresponding to the pixels in the region J for any region J among the LEDs 82, the output Vc of the pixel can be compared against the reference level Q of that pixel for each pixel in the region J.

Furthermore, sometimes the intervals between LEDs 82 near end portions of the LED array 81 are set narrow exceptionally so as to make the illumination of the LED array 81 uniform. In this case, the pixels in the regions J among LEDs 82 whose intervals have been narrowed as well as the reference level Q of these pixels are obtained separately, and the respective output Vc corresponding to the pixels is extracted from the output Vc of the CCD 48 for these regions J, and the output Vc of the pixels can be compared against the reference level Q of these pixels for each pixel.

Next, description is given of carrying out determination of a presence/absence of paper dust and tactics for when a presence of paper dust is determined. As described earlier, the determination of the presence/absence of paper dust is carried out in a state in which the first scanning unit 45 is positioned at a reading position below the original reading glass 65, and therefore the range to be read by the CCD 48 is limited and the presence/absence of paper dust on the surface of the original reading glass 65 is determined in this limited reading range. For this reason, outside the limited reading range, there is a possibility that no paper dust is adhering to the surface of the original reading glass 65.

Accordingly, when a determination of the presence of paper dust is made, the CPU 121 performs drive control of the drive motor 142 while confirming the positions of the first and second scanning units 45 and 46, which are detected by the sensors 141, and moves the first scanning unit 45 in the sub scanning direction below the original reading glass 65, and moves the second scanning unit 46 to change the reading position of the first scanning unit 45 such that the reading range of the CCD 48 is changed in the sub scanning direction within the region of the original reading glass 65.

After this, the CPU 121 sequentially turns on the LEDs 82 one by one as shown in FIG. 10 and for each time causes the CCD 48 to carry out reading in the main scanning direction one time, then extracts the output Vc of the pixels in the region J between the turned on (m−1)th LED 82 and the turned off mth LED 82 from the output Vc of one main scanning line portion, then compares the output Vc of the pixels against the reference level Q of that pixel for each pixel in the region J, and if the output Vc of any pixel has dropped by the prescribed level width W or more with respect to the reference level Q of that pixel, it determines paper dust is present, and if the output Vc of no pixel has dropped by the prescribed level width W or more with respect to the reference level Q of that pixel, it determines an absence of paper dust.

Then, if an absence of paper dust is determined, an original is read by being caused to travel between the original reading glass 65 and the reading guide plate 66 of the first reading portion 41 while the positions of the first and second scanning units 45 and 46 of when the determination was carried out are left set as they were. Furthermore, the positions of the first and second scanning units 45 and 46 are stored, and when an original is again read by being caused to travel between the original reading glass 65 and the reading guide plate 66 of the first reading portion 41, it is possible to again set the stored positions of the first and second scanning units 45 and 46. In this way, reading of an original can be carried out without being affected by paper dust on the surface of the original reading glass 65.

Furthermore, if a presence of paper dust is determined, the first scanning unit 45 is caused to move further in the sub scanning direction below the original reading glass 65, the second scanning unit 46 is also moved, and the reading range of the CCD 48 is further changed in the sub scanning direction within the region of the original reading glass 65.

After this, as described earlier, each time the LEDs 82 are sequentially turned on one by one, the CCD 48 is caused to carry out one time main scanning direction reading to determine the presence/absence of paper dust.

By determining the presence/absence of paper dust while moving the first and second scanning units 45 and 46 in this manner, the positions of the first and second scanning units 45 and 46, which are capable carrying out reading of an original without being affected by paper dust on the surface of the original reading glass 65, can be set.

However, the sub scanning direction length of the original reading glass 65 is limited, and the range of positioning of the first scanning unit 45 below the original reading glass 65 is also limited, and therefore there is a limit to the number of times of movement of the first and second scanning units 45 and 46. Furthermore, if paper dust is detected even after moving the first and second scanning units 45 and 46 from one to multiple times, it is appropriate to presume that the amount of adhering paper dust is large.

For this reason, in a case where paper dust has been detected on the surface of the original reading glass 65 even after a prescribed number of times (from one to multiple times) of moving the first and second scanning units 45 and 46, a message is displayed prompting cleaning of the surface of the original reading glass 65.

Figure 13:
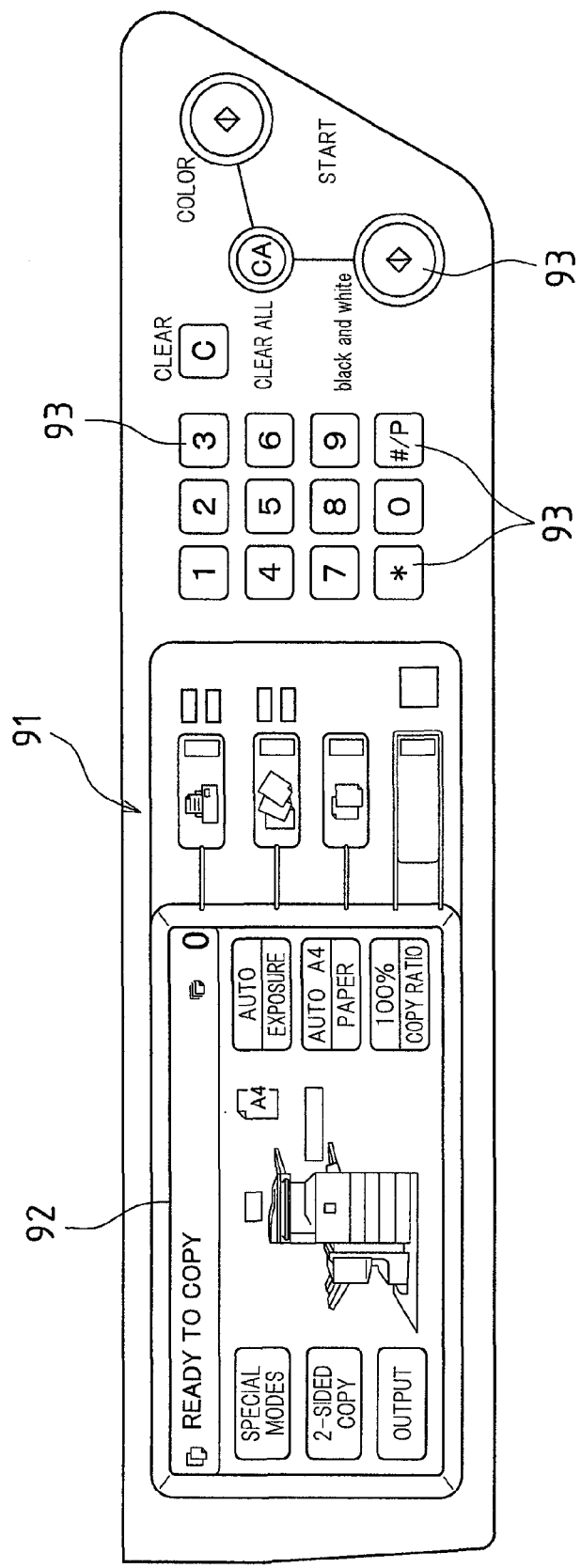
FIG. 13 is a plan view showing an operation panel in the image forming apparatus.

For example, an operation panel 91 such as that shown in FIG. 13 is provided in the image forming apparatus 100, and a message of this kind is displayed on a screen 92 of a liquid crystal display device of the operation panel 91. The operation panel 91 is provided with a liquid crystal display device, a transparent touch panel that is laid over the screen 92 of the liquid crystal display device, and various operation keys 93 and the like, and it is possible to display operational guidance of the image forming apparatus 100 on the screen 92 of the liquid crystal display device and to input instructions to the image forming apparatus 100 corresponding to operations of the operation keys 93, and it is also possible to display a message of this kind on the screen 92 of the liquid crystal display device.

Specifically, when it is determined that the presence of paper dust on the surface of the original reading glass 65 even after carrying out movement of the first and second scanning units 45 and 46 the prescribed number of times (from one to multiple times), the CPU 121 carries out display control of the liquid crystal display device through a display control circuit (not shown in drawings) and, for example, displays on the screen 92 of the liquid crystal display device a message saying "please clean the original reading glass."

Figure 14:
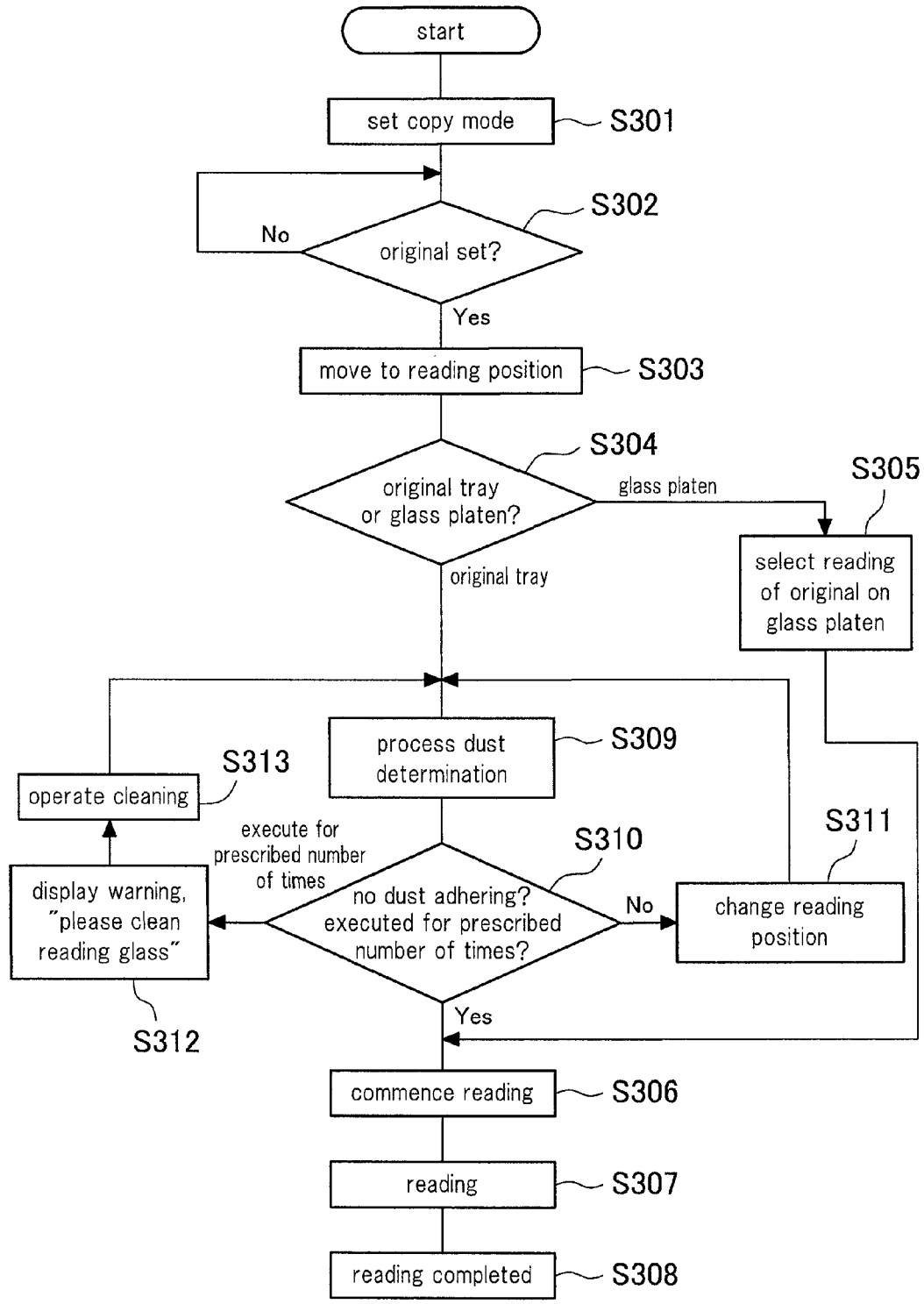
FIG. 14 is a flowchart showing a process for determining the presence/absence of paper dust on the surface of the original reading glass while reading an original.

Next, description is given with reference to a flowchart of FIG. 14 regarding organizing a process for determining the presence/absence of paper dust on the surface of the original reading glass 65 while reading an original.

First, when "copy mode" is specified and set by operation of the operation keys 93 of the operation panel 91 by a user (step S301), the CPU 121 of the first computing portion 114 determines whether or not an original has been set in the original tray 56 or the glass platen 44 based on detection output of the sensors 231 of the transport drive portion 215 (step S302), and if an original has been set ("yes" at step S302), it performs drive control of the drive motor 142 while confirming the positions of the first and second scanning units 45 and 46, which are detected by the sensors 141, and causes the first scanning unit 45 to move to a reading position below the original reading glass 65 and positions the second scanning unit 46 (step S303).

Then, based on the detection output of the sensors 231 of the transport drive portion 215, the CPU 121 determines in which of the original tray 56 and the glass platen 44 the original has been set (step S304).

For example, if an original has been set on the glass platen 44 ("glass platen" at step S304), the CPU 121 performs drive control of the drive motor 142 so as to read an image of the original on the glass platen 44 (step S305), then causes the LED arrays 81 of the illumination portion 51 to expose the original on the glass platen 44 while causing the first and second scanning units 45 and 46 to move in synchronization in the sub scanning direction, thereby reading an image of the front side of the original using the CCD 48 (steps S306 to S308). After undergoing A/D conversion and the execution of various types of image processing, the output of the CCD 48 is transmitted to the laser exposing apparatus 1 of the image forming apparatus 100, and the image is recorded onto a recording paper in the image forming apparatus 100. As described earlier, even if paper dust is adhering to the surface of the glass platen 44 at this time, the paper dust appears only in a spot manner in the image read by the CCD 48, and the influence of this paper dust is small.

Furthermore, if an original is set in the original tray 56 ("original tray" at step S304), the CPU 121 sequentially turns on each of the LEDs 82 of one row of the illumination portion 51 of the first scanning unit 45 one by one as shown in FIG. 10 in a state in which the first scanning unit 45 is positioned at the reading position below the original reading glass 65 and the second scanning unit 46 is positioned, and at each time thereof causes the CCD 48 to carry out one time of main scanning direction reading, then inputs digital signals that indicate the output Vc of the CCD 48 and performs arithmetic processing on the digital signals to determine the presence/absence of paper dust on the surface of the original reading glass 65 (step S309).

If an absence of paper dust on the surface of the original reading glass 65 is determined at this time ("yes" at step S310), the CPU 121 performs drive control of the transport drive portion 215 to pull out and transport an original from the original tray 56 so that the original is caused to travel between the original reading glass 65 and the reading guide plate 66 of the first reading portion 41, then the original is further transported through the second reading portion 43 and from the paper discharge roller 58 to the paper discharge tray 49.

During transport of the original, the front surface of the original is illuminated by the LED arrays 81 of the illumination portion 51 of the first scanning unit 45 through the original reading glass 65 to read an image of the front surface using the CCD 48. Following this, when the original travels over the first glass plate 74 of the second reading portion 43, the back surface of the original may be illuminated by the LED array 83 such that an image of the back surface of the original is read by the line sensor 73S (steps S306 to S308). After undergoing A/D conversion and the execution of various types of image processing, the output of the CCD 48 or the line sensor 73S is transmitted to the laser exposing apparatus 1 of the image forming apparatus 100, and the image is recorded onto a recording paper in the image forming apparatus 100.

Furthermore, if the presence of paper dust on the surface of the original reading glass 65 is determined ("no" at step S310), the CPU 121 performs drive control of the drive motor 142 while confirming the positions of the first and second scanning units 45 and 46, which are detected by the sensors 141, and moves the first scanning unit 45 in the sub scanning direction below the original reading glass 65 to change the reading position of the first scanning unit 45 below the original reading glass 65, and moves the second scanning unit 46 such that the reading range of the CCD 48 is changed in the sub scanning direction within the region of the original reading glass 65 (step S311). After this, the procedure returns to step S309 and S310 and a determination of the presence/absence of paper dust is again carried out.

Then, if there is no paper dust in the reading range of the CCD 48 due to changing the reading position of the first scanning unit 45 ("yes" at step S310), then an original is pulled out and transported from the original tray 56 and the procedure transitions to steps S306 to S308, and reading of an image of the original is carried out by the CCD 48 or the line sensor 73S. At this time, the CPU 121 stores the positions of the first and second scanning units 45 and 46 that have been set at step S311 in the work memory 123 or the like, and during a subsequent reading of an original, it is possible to again set these positions of the first and second scanning units 45 and 46.

Furthermore, in a case where paper dust is present in the reading range of the CCD 48 ("no" at step S310) regardless of the change in the reading position of the first scanning unit 45, the reading position of the first scanning unit 45 below the original reading glass 65 is again changed and the second scanning unit 46 is moved to further change the reading range of the CCD 48 in the sub scanning direction within the region of the original reading glass 65 (step S311), and the procedure returns to steps S309 and S310 to again carry out determination of a presence/absence of paper dust.

Then, if there is no paper dust in the reading range of the CCD 48 ("yes" at step S310), then an original is pulled out and transported from the original tray 56 and the procedure transitions to steps S306 to S308.

Furthermore, the CPU 121 counts the number of times of changing the reading position of the first scanning unit 45 and determines whether or not this number of times of changing has reached a prescribed number of times during the determination of the presence/absence of paper dust (step S310). Then, if paper dust is present in the reading range of the CCD 48 regardless of the number of times of changing reaching the prescribed number of times, that is, in a case where the presence of paper dust is determined regardless of changing the reading position of the first scanning unit 45 repetitively for the prescribed number of times ("executed for prescribed number of times" at step S310), then the CPU 121 displays on the screen 92 of the liquid crystal display device a message saying "please clean the original reading glass" (step S312).

After this, if it is confirmed that cleaning of the original reading glass 65 has been executed (step S313), the CPU 121 performs drive control of the drive motor 142 while confirming the positions of the first and second scanning units 45 and 46, which are detected by the sensors 141, and returns the first scanning unit 45 to an initial reading position below the original reading glass 65, and also moves the second scanning unit 46 to an initial position, then returns to steps S309 and S310. Furthermore, the CPU 121 returns the number of times of changing the reading position of the first scanning unit 45, which had previously been counted, to an initial value of zero.

For example, since it is necessary to open the original transport portion 42 to clean the original reading glass 65, when opening/closing of the original transport portion 42 has been detected by a sensor (not shown in drawings) within a fixed time after the message has been displayed, it can be considered that cleaning of the original reading glass 65 has been carried out.

In a case where the original reading glass 65 has been cleaned, ordinarily a determination will be made of no paper dust on the surface of the original reading glass 65 ("yes" at step S310), then an original is pulled out and transported from the original tray 56 and the procedure transitions to steps S306 to S308, and reading of an image of the original is carried out by the CCD 48 or the line sensor 73S.

With the present embodiment, in a state in which the first scanning unit 45 is positioned at a reading position below the original reading glass 65 and the second scanning unit 46 is positioned in place, and the original is not caused to travel between the original reading glass 65 and the reading guide plate 66 of the first reading portion 41, the LEDs 82 of the illumination portion 51 of the first scanning unit 45 are controlled to be selectively turned on or turned off to produce a shadow of paper dust, and detection is performed of change in the output of the CCD 48 corresponding to the shadow of the paper dust, and therefore the presence/absence of paper dust can be reliably determined.

Furthermore, in a case where the presence of paper dust is determined, the first scanning unit 45 is moved in the sub scanning direction below the original reading glass 65 and the reading range of the CCD 48 is changed in the sub scanning direction within the region of the original reading glass 65 so that reading of the original can be carried out without being affected by paper dust on the surface of the original reading glass 65, and therefore reading of the original can commence promptly and the number of times of cleaning of the surface of the original reading glass 65 can be reduced.

Further still, in a case where paper dust is detected even after the first and second scanning units 45 and 46 have been moved a prescribed number of times, a message is displayed prompting cleaning of the surface of the original reading glass 65, and therefore this cleaning can be executed at appropriate timings.

Next, description is given with reference to FIG. 15 to FIG. 19 of modified examples of patterns of turning on or turning off the LED arrays 81 so that pairings of an ON LED 82 and an OFF LED 82 adjacent to each other can be shifted progressively in the LED arrays 81. The CPU 121 of the first computing portion 114 can achieve any patterning of turning on or turning off by performing control to selectively turn on or turn off each of the LEDs 82 of the LED array 81 on one of the substrates 76 of the illumination portion 51 through the driver circuit 78.

Figure 15:
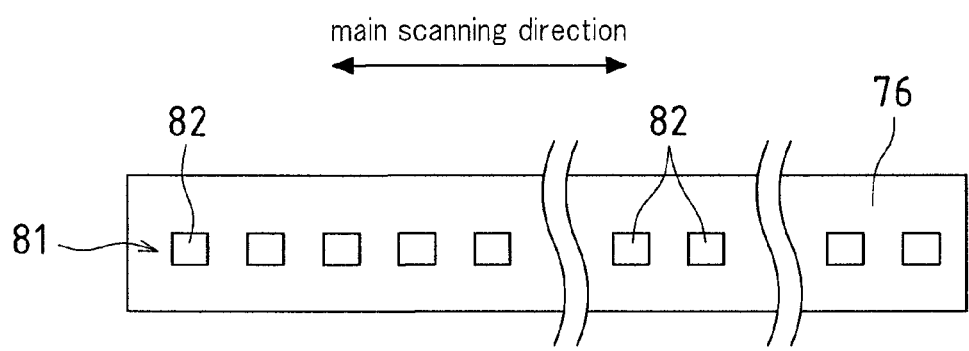

In FIG. 15, each LED 82 of the LED array 81 is sequentially turned on one by one and the turned-on LEDs 82 are kept turned on. In this pattern also, pairings of an ON LED 82 and an OFF LED 82 adjacent to each other are shifted in the LED array 81. Thus, a shadow of paper dust is produced when paper dust is adhering to the surface of the original reading glass 65 in the region J between the (m−1)th turned-on LED 82 and the mth turned-off LED 82, and the output Vc of the CCD 48 corresponding to the pixels in the region J fluctuates.

In this case, power consumption becomes greater when there is a large number of ON LEDs 82, and therefore the LEDs 82 of the LED array 81 may be divided into two or more groups to carry out control of turning on or turning off in each group. For example, if the LEDs 82 of the LED array 81 are divided in first and second groups and all the LEDs 82 of the first group are turned on, after these LEDs 82 are turned off, each of the LEDs 82 of the second group may be sequentially turned on one by one, and the LEDs 82 that are turned on may be kept turned on.

Figure 16:
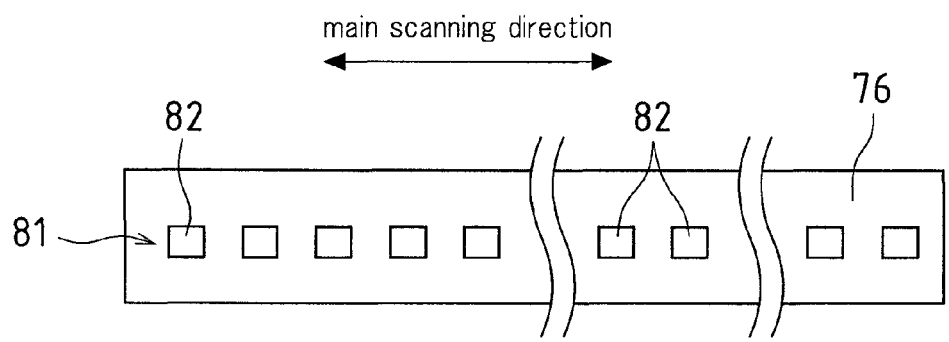
FIG. 16 is a diagram showing a pattern of turning on or turning off in which each ON LED is sequentially turned off one by one and the turned-off LEDs are again turned on step by step to shift the position of the OFF LED.

In FIG. 16, after turning on all of the LEDs 82 except the first LED 82 of the LED array 81, each LED 82 is sequentially turned off one by one, then the LEDs 82 that have been turned off are again turned on step by step so that the position of the turned-off LED 82 is shifted.

Figure 17:
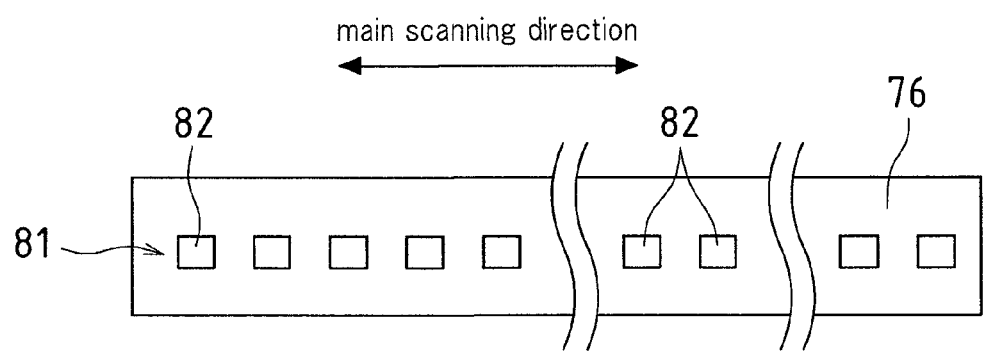
FIG. 17 is a diagram showing a pattern of turning on or turning off in which each of the ON LEDs is sequentially turned off one by one, and the turned-off state of the LEDs is maintained.

In FIG. 17, after turning on all of the LEDs 82 except the first LED 82 of the LED array 81, each LED 82 is sequentially turned off one by one, then the LEDs 82 are kept turned off.

Figure 18:
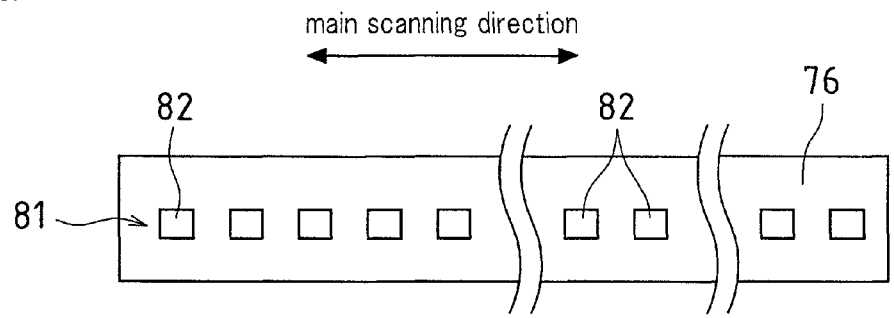
FIG. 18 is a diagram showing a pattern of turning on or turning off in which each of the ON LEDs is sequentially selected in pairs adjacent to each other and turned off, and the turned-off LEDs are again turned on step by step.

In FIG. 18, after turning on all of the LEDs 82 except the first and second LEDs 82 of the LED array 81, the LEDs 82 are sequentially selected and turned off in pairs adjacent to each other, and the turned-off LED 82 is again turned on step by step.

In any of the patterns of FIG. 16 to FIG. 18, pairings of an ON LED 82 and an OFF LED 82 adjacent to each other are shifted in the LED array 81, and a shadow can be produced of paper dust on the surface of the reading guide plate 66 in the region J between the (m−1)th turned-on LED 82 and the mth turned-off LED 82.

However, power consumption becomes greater when there is a large number of ON LEDs 82, and therefore the LEDs 82 of the LED array 81 may be divided into two or more groups to carry out control of turning on or turning off in each group.

Figure 19:
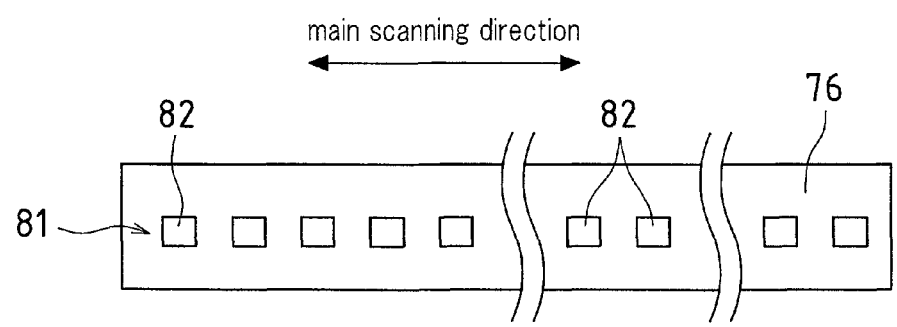
FIG. 19 is a diagram showing a pattern of turning on or turning off in which odd-numbered LEDs and even-numbered LEDs are alternately turned on and turned off.

In FIG. 19, an odd-numbered LED 82 and an even-numbered LED 82 of the LED array 81 are alternately turned on and turned off. In this pattern of turning on or turning off also, pairings of an ON LED 82 and an OFF LED 82 adjacent to each other are shifted in the LED array 81, and a shadow can be produced of paper dust on the surface of the reading guide plate 66 in the region J between the (m−1)th turned-on LED 82 and the mth turned-off LED 82.

Furthermore, in the case of the patterns of turning on or turning off in FIG. 15 to FIG. 18, it is necessary for main scanning direction reading to be carried out one time by the CCD 48 each time the pairing of an ON LED 82 and an OFF LED 82 adjacent to each other is shifted in the LED array 81 and the output Vc of the CCD 48 is extracted corresponding to each pixel in the region J between the ON LED 82 and the OFF LED 82 to detect and determine a shadow of paper dust based on the extracted output Vc of the CCD 48, but in the case of the pattern of turning on or turning off in FIG. 19, if main scanning direction reading is carried out by the CCD 48 when the odd-numbered LEDs 82 of the LED array 81 have been turned on, and main scanning direction reading is carried by the CCD 48 when the even-numbered LEDs 82 of the LED array 81 have been turned on, that is, if reading is carried out by the CCD 48 two times, then it is possible to detect and determine paper dust on all the main scanning lines. Specifically, in a state in which the odd-numbered LEDs 82 of the LED array 81 are turned on, a pairing of the first LED 82 and the second LED 82, a pairing of the third LED 82 and the fourth LED 82, and so on, as well as a pairing of the (m−1)th LED 82 and the mth LED 82 and so on are pairings of an ON LED 82 and an OFF LED 82 adjacent to each other, and therefore detection and determination of paper dust shadow is performed by carrying out main scanning direction reading with the CCD 48 and extracting the output Vc of the CCD 48 corresponding to each pixel in the region J for all of these pairings. Similarly, in a state in which the even-numbered LEDs 82 of the LED array 81 are turned on, a pairing of the second LED 82 and the third LED 82, a pairing of the fourth LED 82 and the fifth LED 82, and so on, as well as a pairing of the mth LED 82 and (m+1)th LED 82 and so on are pairings of an ON LED 82 and an OFF LED 82 adjacent to each other, and therefore detection and determination of paper dust shadow is performed by carrying out main scanning direction reading with the CCD 48 and extracting the output Vc of the CCD 48 corresponding to each pixel in the region J for all of these pairings.

The foregoing described preferable embodiments of the present invention with reference to the accompanying drawings, but the present invention is not limited to these examples. It is evident that a person skilled in the art would be capable of conceiving various modifications and alterations within the scope described by the claims, and naturally all of these are to be interpreted as belonging to the technical scope of the present invention.

Figure 20:
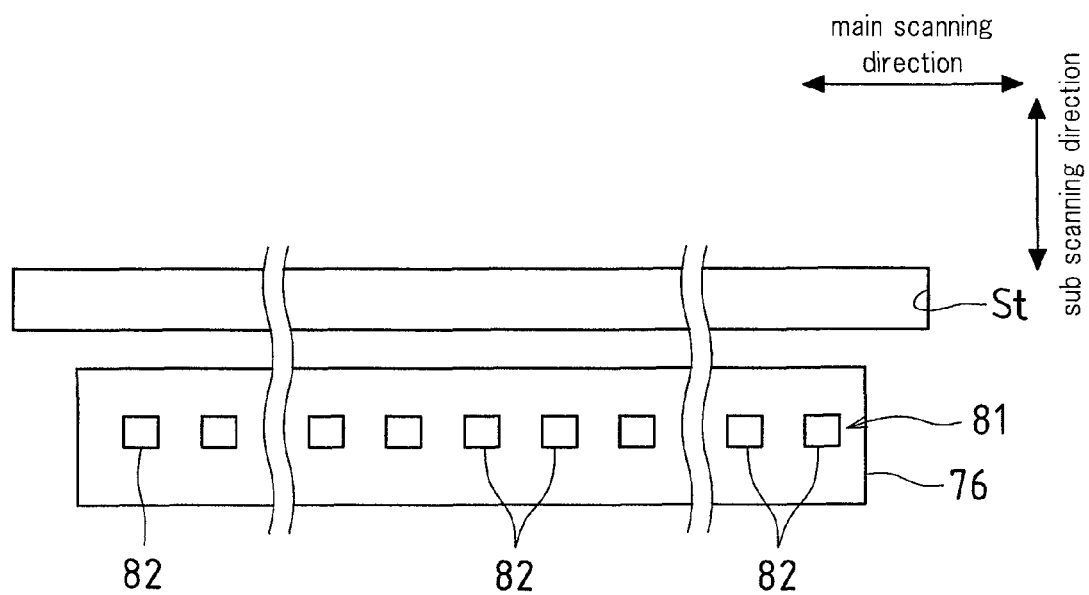
FIG. 20 is a plan view showing one row of the LED array in the first scanning unit.

For example, rather than providing two rows of LED arrays 81 in the illumination portion 51 of the first scanning unit 45, a single row of a LED array 81 may be provided as shown in FIG. 20.

Furthermore, paper dust can be detected for the first glass plate 74 of the second reading portion 43 in a same manner as for the original reading glass 65 of the first reading portion 41. In a case of the second reading portion 43, control is performed to selectively turn on or turn off each LED of the LED array 83 that illuminates the back surface of the original, thereby producing a shadow of paper dust, and the presence/absence of paper dust is determined by detecting change in the output of the line sensor 73S corresponding to the shadow of the paper dust. However, since it is not possible to move the line sensor 73S to vary the reading range of the line sensor 73S, if the presence of paper dust is determined, it is preferable to immediately display a message prompting cleaning of the first glass plate 74.

The present invention can be embodied and practiced in other different forms without departing from the purport and essential characteristics thereof. Therefore, the above-described working examples are considered in all respects as illustrative and not restrictive. The scope of the invention is indicated by the appended claims rather than by the foregoing description. All variations and modifications falling within the equivalency range of the appended claims are intended to be embraced therein.

What is claimed:

1. An image reading apparatus, comprising:
   a reading portion that reads a transported original through a transparent original reading plate,
   an illumination portion that has a plurality of light-emitting elements for illuminating the original provided in at least one row in a reading-scanning direction of the reading portion, and that illuminates the original through the original reading plate,
   a light emission control portion that performs control to selectively turn on or turn off each of the light-emitting elements of the illumination portion, and
   a foreign matter detection portion that detects foreign matter on a surface of the original reading plate based on output of the reading portion by having the light emission control portion perform control to selectively turn on or turn off each of the light-emitting elements
   wherein the light emission control portion performs control to selectively turn on or turn off each of the light-emitting elements of the illumination portion so that pairings of a turned-on light-emitting element and a turn-off light-emitting element adjacent to each other are shifted in a row of the light-emitting elements of the illumination portion.

2. The image reading apparatus according to claim 1, wherein, when one of light-emitting elements adjacent to each other has been turned on and the other of the light-emitting elements has been turned off by the light emission control portion, the foreign matter detection portion detects foreign matter on the surface of the original reading plate based on output of the reading portion corresponding to light of the one of the light-emitting elements that has been turned on.

3. The image reading apparatus according to claim 2, wherein the foreign matter detection portion detects foreign matter on the surface of the original reading plate by comparing an output level of the reading portion corresponding to light of the turned-on one light-emitting element against a preset reference output level.

4. The image reading apparatus according to claims 1, wherein the reading portion comprises a photoelectric converter that performs photoelectric conversion on incident light, and an analog-digital converter that converts an analog signal of the photoelectric converter to a digital signal, and
   the foreign matter detection portion detects foreign matter on the surface of the original reading plate based on the digital signal outputted from the analog-digital converter.

5. The image reading apparatus according to claims 1, comprising a reading position varying portion that, when foreign matter on the surface of the original reading plate is detected by the foreign matter detection portion, causes the reading portion to move or causes the reading portion and the illumination portion to move.

6. An image forming apparatus provided with an image reading apparatus according to claim 5, comprising a display portion that displays to an effect prompting cleaning of the original reading plate when foreign matter on the surface of the original reading plate is detected by the foreign matter detection portion even after movement of the reading portion or movement of the reading portion and the illumination portion by the reading position varying portion is carried out from one time to multiple times.

7. The image reading apparatus according to claims 1, comprising an original detection portion that detects an original that has been set in an original tray,
   wherein the light emission control portion and the foreign matter detection portion operate in response to detection output of the original detection portion.

8. An image forming apparatus provided with an image reading apparatus according to claims 1.

9. The image forming apparatus according to claim 8, comprising a display portion that displays to an effect prompting cleaning of the original reading plate when foreign matter on the surface of the original reading plate is detected by the foreign matter detection portion.

10. An image reading apparatus, comprising:
    a reading portion that reads a transported original through a transparent original reading plate,
    an illumination portion that has a plurality of light-emitting elements for illuminating the original provided in at least one row in a reading-scanning direction of the reading portion, and that illuminates the original through the original reading plate,
    a light emission control portion that performs control to selectively turn on or turn off each of the light-emitting elements of the illumination portion, and
    a foreign matter detection portion that detects foreign matter on a surface of the original reading plate based on output of the reading portion by having the light emission control portion perform control to selectively turn on or turn off each of the light-emitting elements,
    wherein the light emission control portion sequentially turns on each of the light-emitting elements of the illumination portion one by one.

11. The image reading apparatus according to claim 10, wherein the light emission control portion turns off the turned-on light-emitting element each time, thereby shifting the turned-on light-emitting element.

12. The image reading apparatus according to claim 10, wherein the light emission control portion keeps the light-emitting elements turned on.

13. An image reading apparatus, comprising:
a reading portion that reads a transported original through a transparent original reading plate,
an illumination portion that has a plurality of light-emitting elements for illuminating the original provided in at least one row in a reading-scanning direction of the reading portion, and that illuminates the original through the original reading plate,
a light emission control portion that performs control to selectively turn on or turn off each of the light-emitting elements of the illumination portion, and
a foreign matter detection portion that detects foreign matter on a surface of the original reading plate based on output of the reading portion by having the light emission control portion perform control to selectively turn on or turn off each of the light-emitting elements,
wherein, after turning on each of the light-emitting elements of the illumination portion, the light emission control portion sequentially turns off each of the light-emitting elements one by one.

14. The image reading apparatus according to claim 13,
wherein the light emission control portion again turns on the turned-off light-emitting element each time, thereby shifting the turned-off light-emitting element.

15. The image reading apparatus according to claim 13,
wherein the light emission control portion keeps the light-emitting elements turned off.

16. An image reading apparatus, comprising:
a reading portion that reads a transported original through a transparent original reading plate,
an illumination portion that has a plurality of light-emitting elements for illuminating the original provided in at least one row in a reading-scanning direction of the reading portion, and that illuminates the original through the original reading plate,
a light emission control portion that performs control to selectively turn on or turn off each of the light-emitting elements of the illumination portion, and
a foreign matter detection portion that detects foreign matter on a surface of the original reading plate based on output of the reading portion by having the light emission control portion perform control to selectively turn on or turn off each of the light-emitting elements,
wherein, after turning on each of the light-emitting elements of the illumination portion, the light emission control portion sequentially selects and turns off pair by pair light-emitting elements adjacent to each other and again turns on the turned-off light-emitting element each time.

17. An image reading apparatus, comprising:
a reading portion that reads a transported original through a transparent original reading plate,
an illumination portion that has a plurality of light-emitting elements for illuminating the original provided in at least one row in a reading-scanning direction of the reading portion, and that illuminates the original through the original reading plate,
a light emission control portion that performs control to selectively turn on or turn off each of the light-emitting elements of the illumination portion, and
a foreign matter detection portion that detects foreign matter on a surface of the original reading plate based on output of the reading portion by having the light emission control portion perform control to selectively turn on or turn off each of the light-emitting elements,
wherein the light emission control portion alternately turns on and turns off odd-numbered light-emitting elements and even-numbered light-emitting elements of the illumination portion.

18. The image reading apparatus according to claim 17,
wherein, when the odd-numbered light-emitting elements of the illumination portion have been turned on and the even-numbered light-emitting elements have been turned off by the light emission control portion, the foreign matter detection portion detects foreign matter on the surface of the original reading plate based on output of the reading portion corresponding to light of the odd-numbered light-emitting elements and, when the even-numbered light-emitting elements of the illumination portion has or have been turned on and the odd-numbered light-emitting elements have been turned off by the light emission control portion, the foreign matter detection portion detects foreign matter on the surface of the original reading plate based on output of the reading portion corresponding to light of the even-numbered light-emitting elements.

* * * * *